United States Patent
Kurd

(10) Patent No.: US 7,174,357 B2
(45) Date of Patent: Feb. 6, 2007

(54) CIRCUITRY FOR CARRYING OUT DIVISION AND/OR SQUARE ROOT OPERATIONS REQUIRING A PLURALITY OF ITERATIONS

(75) Inventor: Tariq Kurd, Bristol (GB)

(73) Assignee: STMicroelectronics Limited, Bristol (GB)

( * ) Notice: Subject to any disclaimer, the term of this patent is extended or adjusted under 35 U.S.C. 154(b) by 616 days.

(21) Appl. No.: 10/291,850

(22) Filed: Nov. 8, 2002

(65) Prior Publication Data

US 2003/0149713 A1 Aug. 7, 2003

(30) Foreign Application Priority Data

Nov. 22, 2001 (EP) ................................. 01309849

(51) Int. Cl.
*G06F 7/52* (2006.01)
*G06F 7/38* (2006.01)

(52) U.S. Cl. ...................... 708/650; 708/605

(58) Field of Classification Search ................ 708/650, 708/605

See application file for complete search history.

(56) References Cited

U.S. PATENT DOCUMENTS

| | | | |
|---|---|---|---|
| 4,939,686 A | 7/1990 | Fandrianto | |
| 5,177,703 A | 1/1993 | Mori et al. | |
| 5,357,237 A | 10/1994 | Bearden et al. | |
| 5,367,477 A | 11/1994 | Hinds et al. | |
| 5,404,324 A | 4/1995 | Colon-Bonet | |
| 5,787,030 A | 7/1998 | Prabhu et al. | |
| 5,789,955 A | 8/1998 | Scheraga | |
| 5,798,955 A | 8/1998 | Matsubara et al. | |
| 6,108,682 A | 8/2000 | Matheny | |
| 6,138,138 A * | 10/2000 | Ogura | 708/656 |
| 6,298,365 B1 | 10/2001 | Dubey et al. | |
| 6,564,239 B2 * | 5/2003 | Matson et al. | 708/605 |
| 6,847,985 B1 | 1/2005 | Gupta et al. | |

FOREIGN PATENT DOCUMENTS

EP 0 717 350 6/1996

OTHER PUBLICATIONS

Prabhu, et al.; 167 MHz Radix-8 Divide and Square Root Using Overlapped Radix-2 Sages; *Proceedings of the 12th Symposium on Computer Arithmetic*; IEEE Comp. Soc. Press, vol. symp, 12, pp. 155-162, Jul. 19, 1995; XP000548645.

S.E. McQuillan, "Fast VLSI Algorithms for Division and Square Root"; *Journal of VLSI Signal Processing Systems for Signal, Image, and Video Technology*, Kluwer Academic Publishers, Dordrecht, JL, vol. 8, No. 2; Oct. 1, 1994; XP000483301.

(Continued)

*Primary Examiner*—Tan V. Mai
(74) *Attorney, Agent, or Firm*—Jenkens & Gilchrist, PC

(57) ABSTRACT

Circuitry for carrying out an arithmetic operation requiring a plurality of iterations, such as division or square root operations, utilizes N sets of iteration circuitry arranged one after the other so that at least one of the sets of iteration circuitry receives an output from a preceding one of the sets of iteration circuitry. Each of the sets of iteration circuitry includes at least one adder part, wherein a full adder is provided by at least one part in one of the sets of iteration circuitry and a second part in a succeeding one of the sets of iteration circuitry.

20 Claims, 23 Drawing Sheets

OTHER PUBLICATIONS

Matsubara, et al.; "30ns 55-b Shared Radix 2 Division and Square Root Using a Self-Timed Circuit"; *Proceedings of the 12th Symposium on Computer Arithmetic*; IEEE Comp. Soc. Press, US, vol. symp. 12, pp. 98-105; Jul. 19, 1995; XP000483301.

Hsiao, et al., "Design of high-speed low-power 3-2 counter and 4-2 compressor for fast multipliers"; *Electronics Letters, IEE Stevenage*, GB; vol. 34, No. 4; Feb. 19, 1998.

P. Pirsch, "Architekturen der digitalin Signalverarbeitung"; *B.G. Teubner Stuttgart*; pp. 79-81; XP002192162; 1996.

European Search Report, 01309849.6, dated May 31, 2002.

Oberman, S.F. et al: "Division Algorithms and Implementations" IEEE Transactions on Computers, IEEE Inc., vol. 46, No. 8, Aug. 1, 1997, pp. 833-854, XP000701411, ISSN; 0018-9340/97.

"FPU Exponent Prediction of Possible Denorm Result," IBM Technical Disclosure Bulletin, vol. 34, No. 8, Jan. 1992, pp. 199-201; XP000302090.

\* cited by examiner

*Fig. 6a*
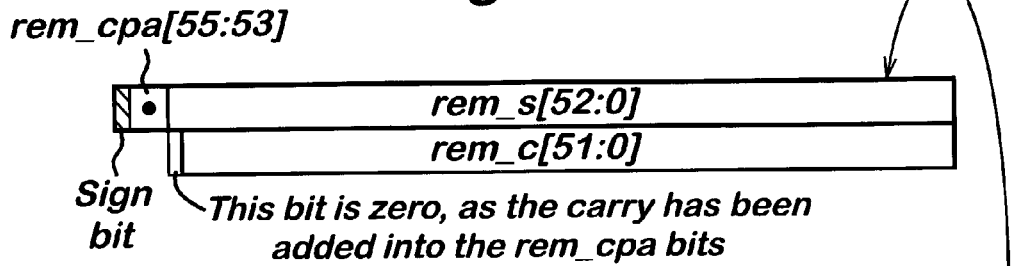
*Fig. 6b*
*Fig. 7*
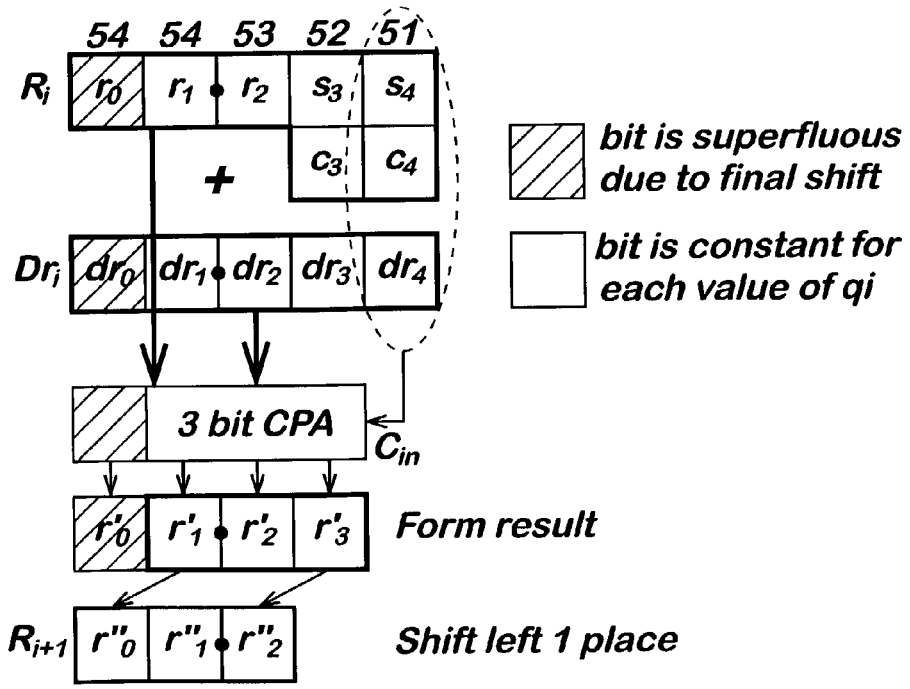

Input to EU2

```
55      52  50
 1 1 1 | 1 1 0 0 0 0 | sum
       | 0 1 0 1 0 0 | carry
         51  49
```

Output to EU2

```
55      52  50
 0 0 0 | 0 0 0 0 0 0 | sum
       | 0 0 1 0 0 0 | carry
         51  49
```

Simply reconstructed word — need extra carry in here

```
55      52  50
 1 1 1 | 1 0 0 0 0 0 | sum
       | 0 0 0 1 0 0 | carry
         51  49
```

Output from FVEC CPA

```
55
 0 0 0 0 0 1 0 0 0
```

Output from FVEC CPA

```
55
 1 1 1 1 0 0 1 0 0
```

Note: only the top bit of the FVEC result is significant, the rest only form the sticky bit

CIRCUITRY FOR CARRYING OUT DIVISION AND/OR SQUARE ROOT OPERATIONS REQUIRING A PLURALITY OF ITERATIONS

CROSS-REFERENCE

This application claims foreign priority from European Patent Application No. 01309849.6 filed Nov. 22, 2001, the disclosure of which is hereby incorporated by reference.

BACKGROUND OF THE INVENTION

1. Technical Field of the Invention

The present invention relates to circuitry for carrying out a square root operation and a division operation.

2. Description of Related Art

When the division X/D is performed, a quotient Q and remainder R are determined which satisfy the following equation:

$$X = Q.D + R \text{ where } D > R >= 0$$

The remainder must be less than the divisor D, otherwise not enough subtractions of the divisor have been performed, but greater than or equal to zero otherwise too many subtractions of the divisor have been performed. Division can be performed using a succession of iterations. Effectively, in each iteration the divisor is subtracted from the remaining sum.

In restoring division the following steps are performed:
1. Ensure that X is less than D so that the resulting quotient is a fraction. This can be achieved by using normalization techniques;
2. Set $R_0 = X$ so the entire dividend (that is the value to be divided and in this case X) becomes the initial remainder;
3. Shift $R_i$ left 1 place, and subtract the divisor D. If $R_i$ is negative then restore the value prior to subtraction and set $q_i$ to 0. $q_i$ is quotient bit i. Otherwise do not restore the value and set $q_i$ to 1; and
4. Perform n−1 iterations for an n-bit divisor X.

The resulting quotient is $Q = 0.q_1 q_2 q_3 \ldots q_{n-1}$.

The iteration can be defined by the following formula:

$$R_i = 2R_{i-1} - q_1 D \text{ where } i=1, 2, \ldots n-1$$

The problem with this method is the restoration of the previous result may be required on every step. The non-restoring algorithm is an alternative way of performing division and will perform the subtraction anyway and compensate for it on the next iteration if the resulting remainder is negative by adding the divisor instead. The decision whether to add the divisor on the next iteration is based on whether the remainder was either less than or greater than or equal to 0. The selection rule for determining each bit of the quotient is as follows:

$$q_i = 1 \text{ if } 2R_{i-1} >= 0 \text{ and}$$

$$q_i = -1 \text{ if } 2R_{i-1} < 0.$$

Each bit of the quotient represents either 1 or −1. In the resulting word −1 is represented by bit 0 and +1 by bit 1. This requires conversion to a standard binary number. Thus, to convert the quotient $0.q_1 q_2 \ldots q_{m-1}$ into the two's complement representation $S_0.S_1.S_2 \ldots S_{n-1}$ the following holds:

$$s_0. S_1. S_2 \ldots S_m = \bar{q}_1 q_2 q_3 \ldots q_m 1.$$

In other words, the top bit is complemented, the word is shifted left one place and the least significant bit is set to one.

The SRT (Sweeney, Robertson and Tocher) division algorithm is an extension of non-restoring division. In each iteration, an addition, a subtraction or nothing is performed. The decision is taken based on the value of the current remainder. The current partial remainder can be approximated by referring only to a few of the most significant bits and a suitable quotient digit assigned. The selection rule is as follows:

$$q_i = 1 \text{ if } 2R_{i-1} >= D$$

$$q_i = 0 \text{ if } -D <= 2R_{i-1} < D$$

$$q_i = -1 \text{ if } -D > 2R_{i-1}.$$

The range of the divisor can be restricted to make the decision making process simpler by allowing the range:

$$\tfrac{1}{2} <= |D| < 1.$$

This means that the selection rule can be implemented as follows:

$$q_i = 1 \text{ if } 2R_{i-1} >= \tfrac{1}{2}$$

$$q_i = 0 \text{ if } -\tfrac{1}{2} <= 2R_{i-1} < \tfrac{1}{2}$$

$$q_i = -1 \text{ if } -\tfrac{1}{2} > 2R_{i-1}.$$

As the comparison operations are only less than ½ or greater than or equal to ½, the examination of the lower or least significant bits is never required, only the sign bit down to one bit to the right of the binary point needs to be examined. In other words, only three bits in total need to be considered. The selected quotient bits are represented by three values −1, 0 and 1.

Square root determination uses a similar algorithm to division. In particular, the following is evaluated:

$$R_i = 2R_{i-1} - q_i(2Q_{i-1} - q_i 2^{-1}) \text{ where } i=1, 2, \ldots n-1$$

Thus, the value used to modify the result is a function of the previous quotient $Q_{i-1}$ as well as the currently determined bit $q_i$. The simple selection rule is similar to that used for division and is as follows:

$$q_i = 1 \text{ if } \tfrac{1}{2} <= 2R <= 2$$

$$q_i = 0 \text{ if } -\tfrac{1}{2} <= 2R_{i-1} < \tfrac{1}{2}.$$

$$q_i = -1 \text{ if } -2 <=> 2R_{i-1} < \tfrac{1}{2}.$$

Reference is made to FIG. 1 which shows a known arrangement for implementing a SRT division stage. The arrangement shown in FIG. 1 is to deal with a 53 bit number. Accordingly, a 55 bit carry save adder 10 is provided. The carry save adder 10 receives the remainder $R_{i-1}$ defined by its sum and carry parts and also a third input from a multiplexer 12. Depending on the output of the multiplexer, the divisor is added, subtracted or nothing is changed by the output of the multiplexer. The multiplexer 12 is controlled by the signal $q_{i-1}$ representing that bit of the quotient.

The output of the carry save adder is signal $R_i$ again defined by its sum and carry parts. The three most significant bits of the sum and carry parts of the remainder output by the carry save adder 10 are input to a three bit carry propagate adder 14 which sums the three most significant bits. The output of the carry propagate adder 14 is input to a quotient selection logic block 16. The quotient selection logic block 16 is arranged to implement the selection rule discussed previously so as to provide the value of $q_i$. The quotient selection logic block 16 also receives the value $q_{i-1}$ as an input.

The three bit carry propagate adder 14 is arranged to take the output from the carry save adder 10. Thus, for each iteration, two additions need to be performed, one by the carry save adder 10 and one by the carry propagate adder 14.

SUMMARY OF THE INVENTION

According to a first aspect of the present invention, there is provided circuitry for carrying out an arithmetic operation requiring a plurality of iterations, said circuitry comprising N sets of iteration circuitry arranged one after the other so that at least one of said sets of iteration circuitry receives an output from a preceding one of said sets of iteration circuitry, each of said sets of iteration circuitry comprising at least one adder part, wherein a full adder is provided by at least one part in one of said sets of iteration circuitry and a second part in a succeeding one of said sets of iteration circuitry.

According to a further aspect of the present invention, there is provided an adder for adding three inputs, said adder comprising a first stage for receiving two of said inputs and a second stage for receiving the third of said inputs, wherein said third input is used later than said first and second inputs.

According to a further aspect of the present invention, there is provided circuitry for carrying out an arithmetic operation in respect of at least one value, said circuitry comprising calculation circuitry for performing said arithmetic operation, means for identifying if said value is a predetermined value, output means for providing an output for said circuitry for carrying out the arithmetic operation, said output means being arranged to receive an output from said calculation circuitry; and circuitry different to said calculation circuitry for providing an output to said output means if said value is identified by said identifying means as being a predetermined value.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 6 shows the format of the remainder;

FIG. 7 shows the calculation of the upper remainder bits;

DETAILED DESCRIPTION OF THE DRAWINGS

A summary of some of the terms used in this document is given below:

| Term | Definition |
| --- | --- |
| Divisor | The value to divide by (i.e. b when performing a/b) |
| Dividend | The value to be divided (i.e. a when performing a/b) |
| Radicand | The value to be square rooted |
| Quotient | The result of the computation, there may be a non-zero associated remainder |
| Remainder | If the divisor does not divide the dividend exactly then there will be a remainder |
| Positive quotient | This term relates to the true value of the quotient |
| Negative quotient | This term relates to a decremented version of the positive quotient |
| Root multiple | A multiple of the current positive or negative quotient value, which is used to modify the current remainder when square rooting |

Embodiments of the present invention are able to provide single and double precision floating point divide and square root operations on normalized significands. Accordingly the significands take the following format:

$$+/-1.a_1 a_2 \text{-} \ldots a_k \times 2^n.$$

Figure 2A:
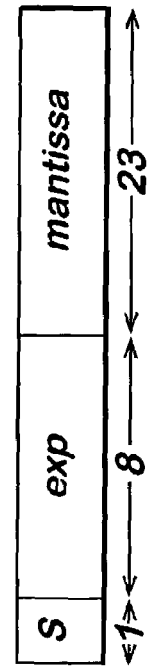
FIG. 2a shows the format of a single precision floating point number.
Figure 2B:
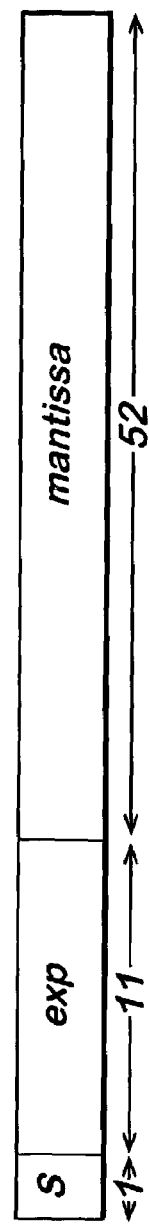
FIG. 2b shows the format of a double precision floating point number.

By "normalized" it is meant that there is always a single one to the left of the point. In a single precision floating point number shown in FIG. 2a the sign s is represented by a single bit, the exponent n is represented by 8 bits and the fractional part of the mantissa is represented by 23 bits. The mantissa is the number $a_1 a_2 \ldots$ ak. With reference to FIG.

2b, the double precision floating point number will be described. The sign s is again represented by 1 bit. The exponent part n is represented by 11 bits and the fractional part of the mantissa is represented by 52 bits.

In order to perform the division operation on the following number $(1.a \times 2^n)$ divided by $(1.b \times 2^m)$, the following is performed: $1.a/1.b \times 2^{n-m}$. The determining of the exponent is a simple operation as n–m is a simple subtraction. The system which will be described in more detail hereinafter is able to form the division 1.a/1.b. For single point precision where the fractional part of the mantissa is 23 bits, this will produce a 26 bit result. Likewise, for a double precision floating point number, 55 bits would be required for the result.

The system which will be described in more detail hereinafter is also able to perform the square root function. Embodiments of the present invention use the SRT algorithm discussed hereinbefore. However it should be appreciated that embodiments of the present invention can use other suitable algorithms.

Square root extraction is based upon completing the square and is very similar to the division algorithm, the main difference is that instead of evaluating:

$$R_i = 2R_{i-1} - q_i \cdot D$$

where i=1, 2, . . . n–1 the following is evaluated:

$$R_i = 2R_{i-1} - q_i \cdot (2Q_{i-1} + q_i 2^{-i})$$

Therefore the value used to modify the result is a function of the previous quotient $Q_{i-1}$, as well as the currently determined bit $q_i$. The simple selection rule is very similar to that used for the SRT division. In particular the implemented selection rule is the same as for the division discussed hereinbefore.

Figure 3:
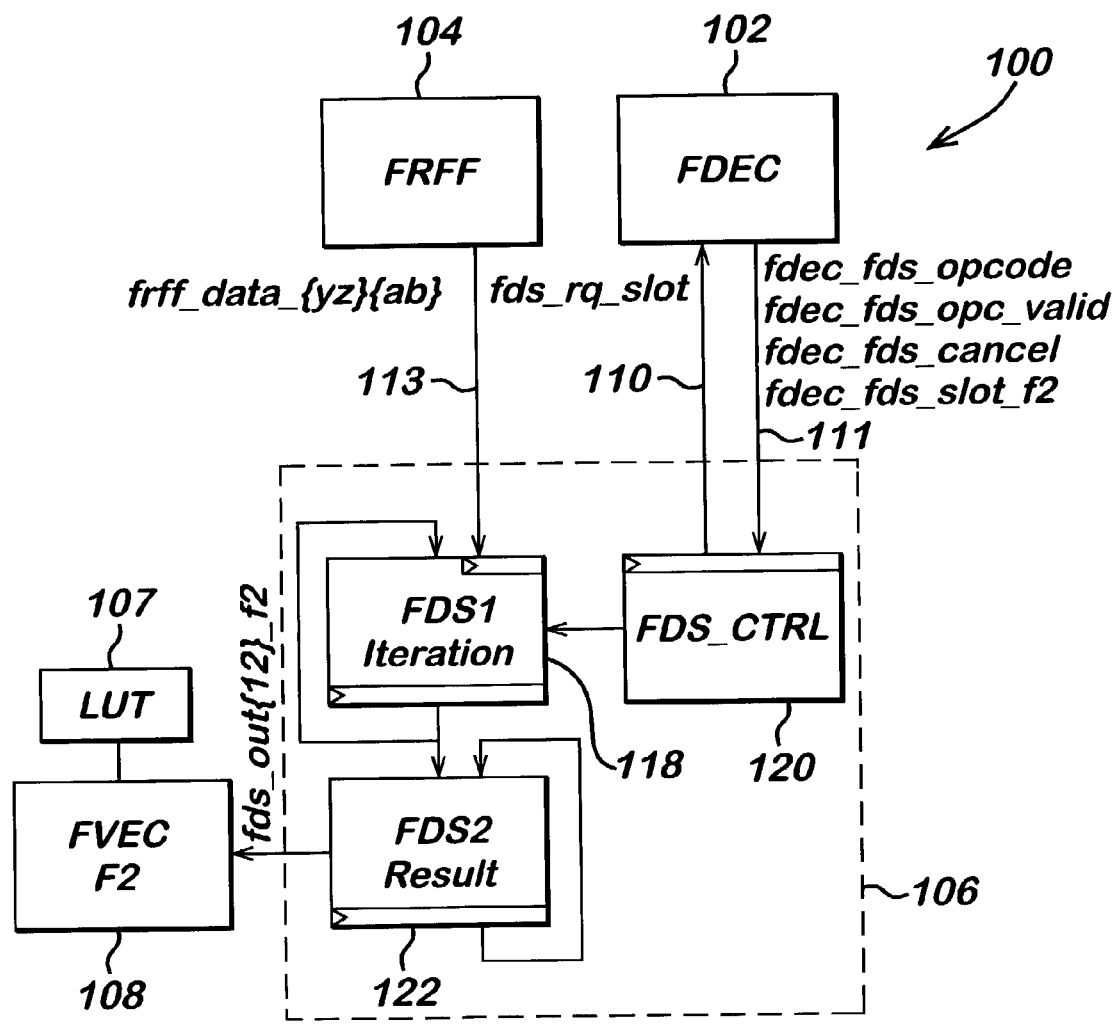
FIG. 3 shows a system incorporating embodiments of the present invention.

Reference is made to FIG. 3 which shows a system embodying the present invention. The system 100 comprises a controller 102, register files 104, iteration block 106 and floating point vector unit 108. The controller 102 will provide the iteration unit 106 with an opcode which indicates the operation to be performed. Thus the opcode will indicate if a division or a square root operation is to be performed and if it is single or double precision. Additionally, an indication is provided to confirm the opcode is valid. Finally, the controller 102 is also able to send a signal to the iteration block 106 to cancel the operation. This is done via connection 111.

The register files 104 have the divisor D and the dividend X. The register files 104 provide the values of the divisor and the dividend to the iteration block 106 via connection 113.

The iteration block 106 carries out the iteration required in order to perform the division or square root operation. The output of the iteration block 106 is output to the floating point vector unit 108. The iteration block 106 comprises an iteration unit 118 which carries out the iteration. A control unit 120 is provided which controls the iteration operation. Finally, the iteration block 106 also comprises a result block 122. The function of the result block 122 is to format the result and hold the result until a slot is available on the pipeline for those results.

On receiving the opcode and valid information, the iterative block 106 starts working. Two cycles before the result will be ready, the iterative block 106 sends a request to the controller 102 for a slot in the floating point vector unit 108 into which to place the resulting quotient and the final remainder in redundant form. The floating point vector unit 108 then completes the operation by performing addition, normalization, rounding and adding the exponent and sign bit to the result. In the case that the arithmetic pipe is busy, a slot may not be granted immediately and so the result waits in the result block 122 until the slot is granted. This is indicated by a signal from the controller 102. Once the results have been transferred, a new iterative operation can be performed.

Figure 4:
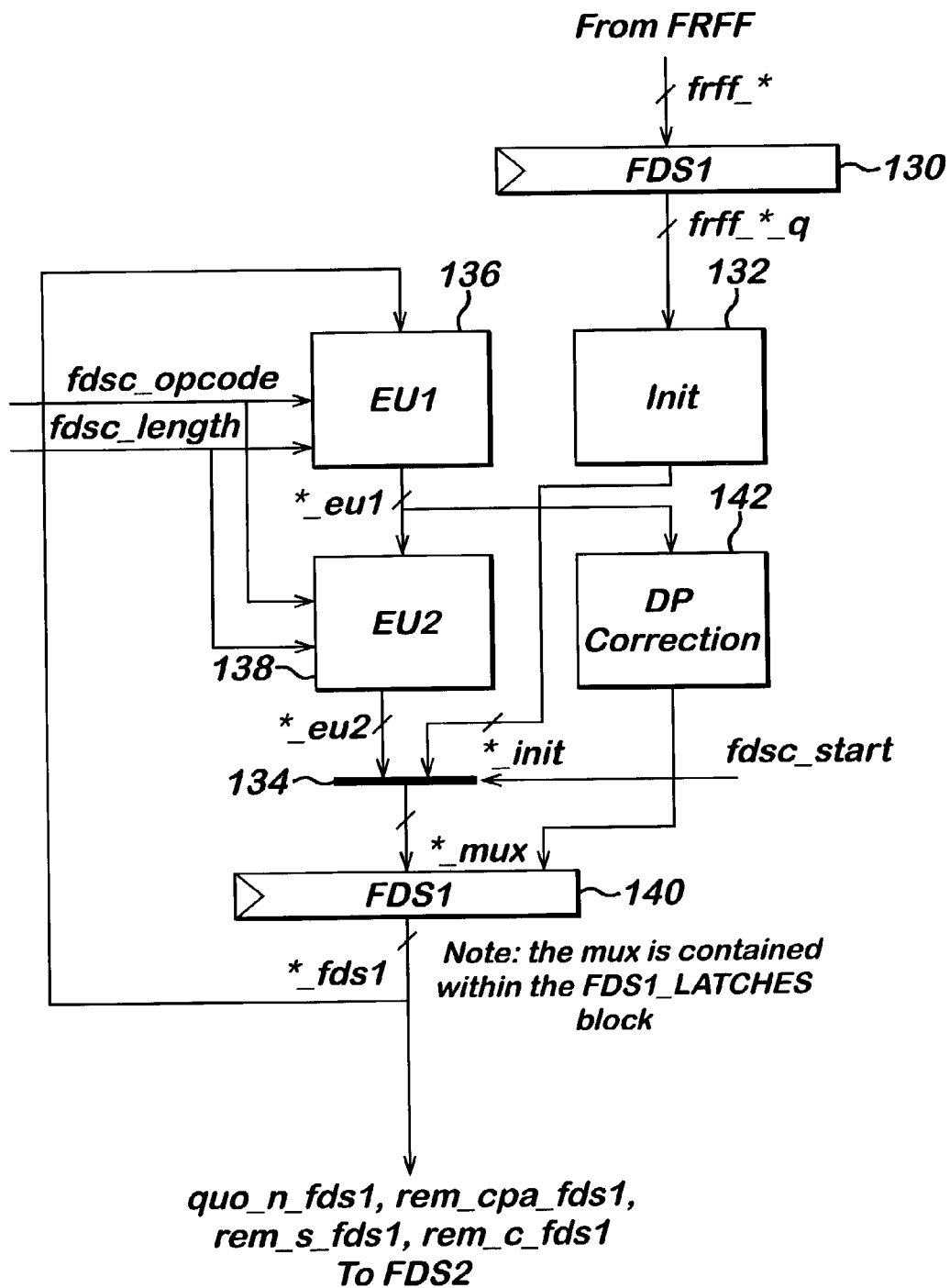
FIG. 4 shows the iteration block in more detail.

Reference will now be made to FIG. 4 which shows the iteration unit 118 on the iteration block 106 in more detail. A first set of flip-flops 130 are provided which store the values of the divisor and dividend received from the file registers. These values are forwarded to an initialization unit 132. The initialization unit 132 will provide the initial starting values. It converts the operands so that they appear to have come from a previous execution unit. The output of the initialization unit 132 is input to a multiplexer 134. The output of the initialization unit is fed back to the input of the first execution unit via the multiplexer and flip flops 140.

Also provided are first and second execution units 136 and 138. Execution unit 136 performs a first iteration whilst the next iteration is formed by the second execution unit 138. Both of the execution units 136 and 138 receive information defining the opcode and the length of the data. The opcode defines whether a division or square root operation is to take place. The length of the data effectively defines whether or not a single precision or double precision number is used. The output of the first execution unit 136 is input to the second execution unit 138. The output of the second execution unit 138 is input to the multiplexer 134.

At the beginning of the operation, the output of the initiation unit 132 will be selected as the output of the multiplexer. However, in subsequent iterations, the output from the second execution unit 138 will be selected as the output of the multiplexer 134. The output of the multiplexer 134 is input to a second set of flip-flops 140. The output of the second set of flip-flops 140 are fed back to the input of the execution unit 136 so that any subsequent iteration operations which need to be performed can be done. When all of the necessary iterations have been performed, the output of the second set of flip-flops 140 is input to the result block 122.

A double precision correction unit 142 is also provided. A single precision calculation will require an even number of iterations whilst the double precision calculation requires an odd number of iterations. If the final result of a double precision calculation were to be iterated again, the wrong result would be obtained. The correction unit 142 receives part of the output from the first execution unit 136 and provides an output to the second set of flip flops 140. This is described in more detail hereinafter.

Figure 5:
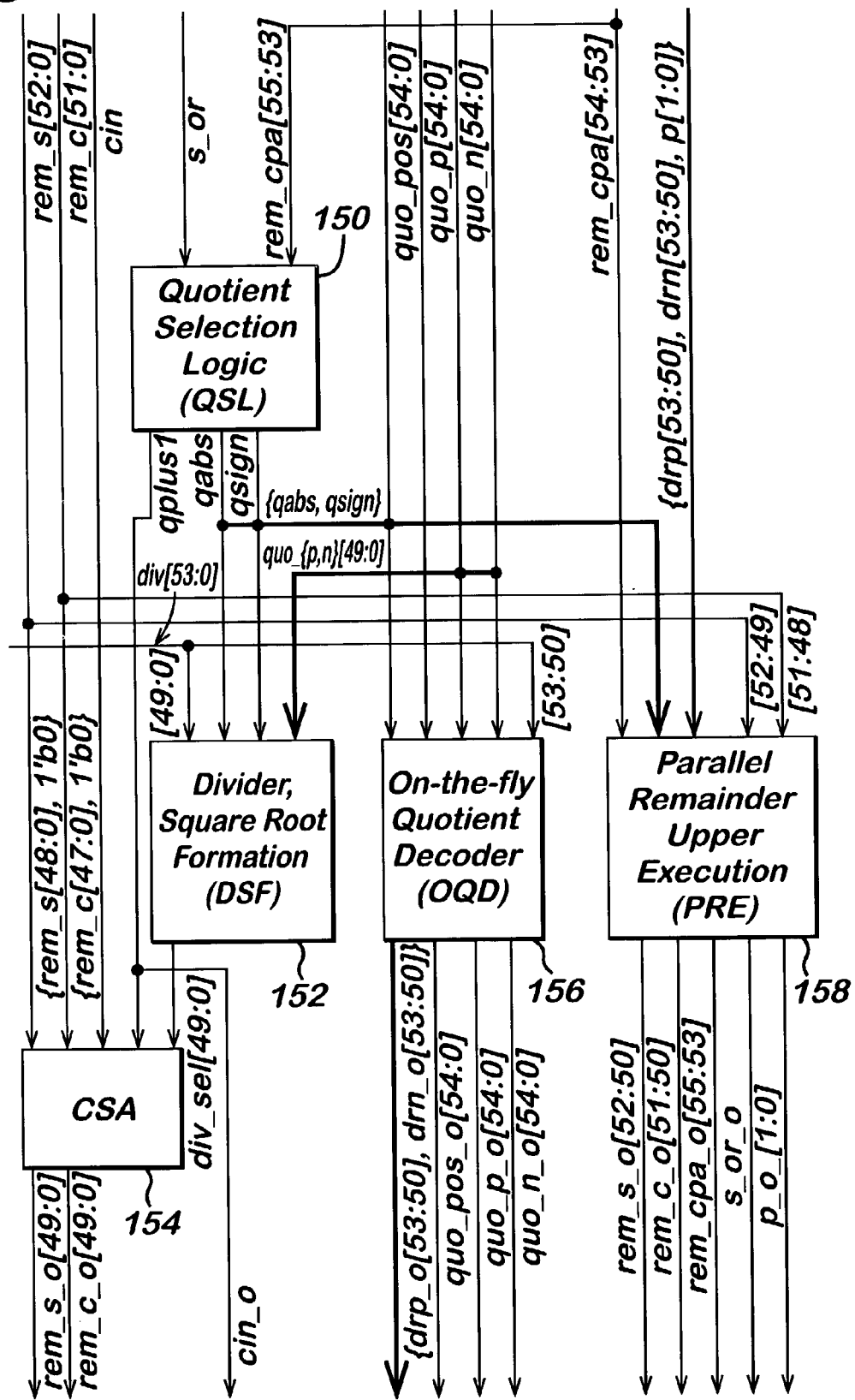
FIG. 5 shows one execution unit of FIG. 4 in more detail.

Reference will now be made to FIG. 5 which shows one of the execution units 136 or 138 in more detail. It will be appreciated that the two execution units have the same basic structure. The execution units may be substantially the same or may be optimized as described in more detail hereinafter. The execution unit has a quotient selection logic block 150, a divider square root formation block 152, a carry save adder 154, an on the fly quotient decoder 156 and a parallel remainder upper execution unit 158.

The quotient selection logic 150 determines the quotient bit for the current step which dictates whether to add, subtract or do nothing to the current remainder. The on the fly quotient decoder then generates the full length quotient result. This process in the on the fly quotient decoder involves the generation of a positional bit, which is one bit set in a 55 bit word. Initially, bit 54 is set and this is shifted logically to the right on each iteration to calculate all 55 bits of the double precision quotient. It should be appreciated that only the top 26 bits are used for single precision quotients. Effectively, the quotient selection logic block 150 looks at the top bits of the remainder and makes a decision as to whether to add to, subtract from or do nothing to the remainder on the current iteration.

The quotient selection logic 150 receives the three bit partial remainder output from the carry propagation adder (in the parallel remainder upper execution unit 158) from the previous stage. This is basically bits 55, 54 and 53. The quotient selection logic unit 150 also receives the result of the OR operation of the s3 and c4 of the previous execution unit and in particular from the parallel remainder upper execution unit 158 of the previous execution unit. s3 represents the third bit of the sum of the remainder whilst c4 represents the fourth bit of the carry of the remainder. These are of the same significance as will be explained later.

In the embodiment of the invention, the selected quotient bit in any step can take three values, that is 0, +1 and −1. Accordingly, two bits are required for a binary representation. Reference is made to the following table, Table 1, which shows the representation used in preferred embodiments of the present invention.

TABLE 1

| Digit | $q_{abs}$ | $q_{sign}$ |
|---|---|---|
| 0 | 1 | X |
| 1 | 0 | 1 |
| −1 | 0 | 0 |

$q_{sign}$ represents the sign of the bit and $q_{abs}$ is 0 if the value is equal to +1 or −1 and 1 if the value is 0.

Reference is made to Table 2 which shows how a quotient bit is selected. The quotient selection logic includes circuitry which is able to implement this logic.

TABLE 2

| Approximated partial remainder | | | | Digit selection | | | Value of partial |
|---|---|---|---|---|---|---|---|
| r0 | r1 | r2 | rx | qi | qabs | qsign | remainder |
| 0 | 1 | 1 | x | 1 | 0 | 1 | [3/2, 2), [−2, −3/2) |
| 0 | 1 | 0 | x | 1 | 0 | 1 | [1, 2) |
| 0 | 0 | 1 | x | 1 | 0 | 1 | [1/2, 3/2) |
| 0 | 0 | 0 | 1 | 1 | 0 | 1 | [1/4, 1) |
| 0 | 0 | 0 | 0 | 0 | 1 | 1 | [0, 1/2) |
| 1 | 1 | 1 | x | 0 | 1 | 0 | [−1/2, 1/2) |
| 1 | 1 | 0 | x | −1 | 0 | 0 | [−1, 0) |
| 1 | 0 | 1 | x | −1 | 0 | 0 | [−3/2, −1/2) |
| 1 | 0 | 0 | x | −1 | 0 | 0 | [−2, −1) |

$r_0$, $r_1$ and $r_2$ represent the top three bits of the remainder. $r_x$ represents the result of the OR operation of s3 with c4. Using the information provided by this table, the quotient selection logic unit 150 provides three outputs, $q_{plus1}$, $q_{abs}$ and $q_{sign}$. $q_{abs}$ and $q_{sign}$ are as defined by the table. $q_{sign}$ is simply the inverse of $r_0$. A qplus1 output is generated by the quotient selection logic which becomes a +1 correction factor required in the carry save adder 154 as the divisor or root multiple is only complemented when $q_i$ is +1.

Figures 16, 18:
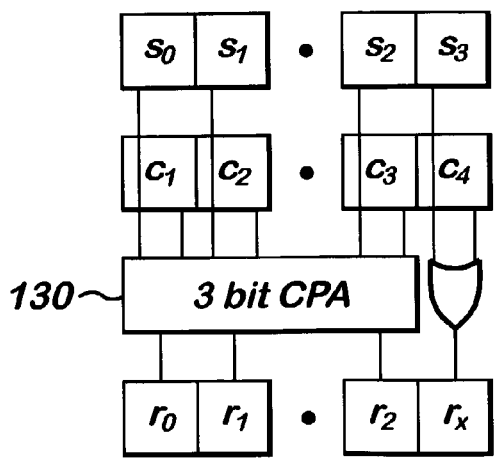
FIG. 16 illustrates the double precision connection.
FIG. 18 illustrates how the partial remainder is formed.

Reference is made to FIG. 18 which shows how the values of r in the above table are provided. A three bit carry propagate adder 170 receive sum bits $S_0$–$S_3$ and carry bits $c_1$–$c_4$. From these values $r_0$–$r_2$ are generated. An OR gate receives sum bit $S_4$ and carry bit $c_3$ and this generates bit $r_x$ (s_or).

During the first iteration of any operation the selected quotient bit must be +1 to simplify the parallel remainder upper execution unit. ½ is subtracted from the remainder if the current operation is a square root operation. The upper bits after an alignment are 0.10, 1.00, 1.10 or 1.11 and so subtracting ½ gives 0.00, 0.10, 1.00 and 1.01 respectively. The necessary left shift after subtraction occurs in the first execution unit when no subtraction occurs.

The first selected quotient bit on any operation is +1 so that a subtraction is performed. Referring to FIG. 7, the bits dr1 and dr2 should be constant to simplify the logic of the parallel remainder upper execution block 158. This is only not the case for the first cycle of a square root operation and so the parallel remainder execution block 158 cannot be used to perform the subtraction. Instead it is performed in the initialization block 132 so that when the initial remainder is presented to the first execution unit no subtraction is performed but the quotient word must be generated and the left shift of the remainder must be performed. For this reason, the carry save adder block 154, the parallel remainder upper execution block 158 and the divide/square root formation block see a selected quotient bit of 0 and the on the fly quotient decoder 156 sees 1.

Normally the initial remainder will always yield a selected quotient bit of +1 automatically but as the initial subtraction has already been performed the result may be zero yielding a quotient bit of 0. For this reason, the s_or input to the first quotient selection logic block is forced high for the first operation of a square root and so the qabs signal which drives the on the fly quotient decoder unit and which requires no extra logic is used in the quotient selection logic block 150. A separate qabs signal is used to drive the carry save adder, the divider/square root formation block 152 and the parallel remainder execution block 158. This uses a signal to force the output to be 0 for the first cycle of a square root only. It should be appreciated that the qplus 1 output from the quotient selection logic 150 is forced to zero on the first cycle of a square root to prevent the carry for 2's complementation being added in on the next step.

The $q_{abs}$ and $q_{sign}$ outputs from the quotient selection logic are input to each of the divider square root formation unit 152, the on the fly quotient decoder 156 and the parallel remainder upper execution unit 158.

The quotient selection logic block 150 generates the quotients bits in a redundant form, which are decoded into a normal binary representation. The quotient decoding involves the generation of a positional bit, which is 1 bit set in a 55 bit word. Initially bit 54 is set, and this is shifted logically to the right on each iteration to calculate all 55 bits of the double precision quotient, although only the top 26 bits are used for single precision quotients.

The table below, Table 3, references a variable i which refers to which bit is set in the quo_pos bus which is the positional bit mentioned above, and is shifted to the right 1 place on each step of the algorithm. At each step a positive and negative representation of the current quotient word is kept. These signals are referred to as quo_p and quo_n, and the actual value of each of these at step i of the algorithm is $P_i$ and $N_i$ respectively. The value I of i in the equations is the number of the current iteration and counts from 0 to 25 for single precision, and 0 to 54 for double precision. The implicit binary point of the quotient words is in between bits 54 and 53 in the divide case, and between 55 and 54 in the square root case.

TABLE 3

| Quotient Bit $q_1$ | quo_p mapping | quo_n mapping | Comment |
|---|---|---|---|
| 1 | $P_i = P_{i-1} + 2^{-1}$ | $N_i = Pi-1$ | Transfer quo_p to quo_n and then set bit in quo_p |
| 0 | $P_i = P_{i-1}$ | $N_i = N_{i-1} + 2^{-1}$ | quo_p remains constant, set bit in quo_n |
| -1 | $P_i = N_{i-1} + 2^{-1}$ | $N_i = N_{i-1}$ | Transfer quo_n to quo_p and then set bit in quo_p |

At each step of the algorithm for divide, a value is added to the current remainder which is either {+D, 0, −D} where D is the divisor, and remains constant for the entire operation. In the square root case, a multiple of the current partial root must be calculated. This can be determined from the current positive and negative quotient words $P_i$ and $N_i$.

The next partial root is calculated by using the following iterative formula:

$$R_i = 2R_{i-1} - q_i(Q_{i-1} + q_i 2^{-i}) = 2(R_{-1} - q_i(Q_{i-1} + q_i 2^{-(i+1)}))$$

This can be rewritten for the different values of $q_i$ as shown in Table 4 below, and then be rewritten again in terms of the redundant $P_i$ and $N_i$ representations of the quo_p and quo_n. The following relationship holds:

$$P_i = Q_i$$

$$N_i = Q_i - 2^{-i}$$

TABLE 4

| $q_1$ | $r_i$ in terms of Q | $r_i$ in terms of P, N | Comment |
|---|---|---|---|
| 1 | $R_i = 2(R_{i-1} - (Q_{i-1} + 2^{-(i+1)}))$ | $R_i = 2(R_{i-1} - (P_{i-1} + 2^{-(i+1)}))$ | Inner value becomes $p_{i-3}p_{i-2}p_{i-1}010\ldots0$ |
| 0 | $R_i = 2R_{i-1}$ | $R_i = 2R_{i-1}$ | Root multiple is zero |
| -1 | $R_i = 2(R_{i-1} + (Q_{i-1} - 2^{-(i+1)}))$ | $R_i = 2(R_{i-1} + (N_{i-1} + 2^{-i} + 2^{-(i+1)}))$ | Inner value becomes $n_{i-3}n_{i-2}n_{i-1}110\ldots0$ |

Therefore, after initialization, the value of $N_i$ is a decremented version of $P_i$, where the size of the decrement depends upon the current bit position i, and is $2^{-i}$.

The divider/square root formation unit 152 will now be described. This unit 152 determines the word to be added to the current remainder in dependence on the output from the quotient selection logic block 150. It is either a function of the current quotient, that is the root multiple, or of the current divisor.

Figure 1:
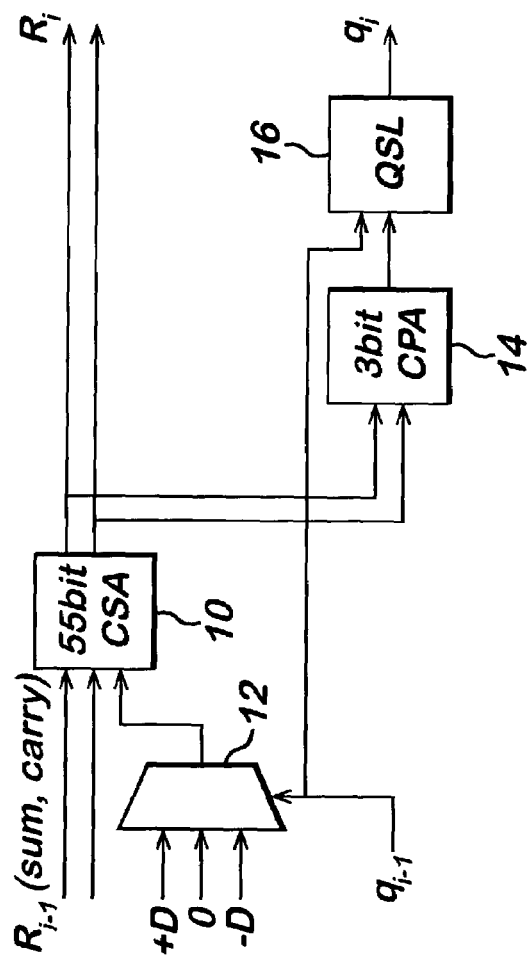
FIG. 1 is a known circuit for implementing SRT division.

The divider/square root formation unit 152 also receives the P and N versions of the quotient. This is similar in function to the multiplexer 12 of FIG. 1. Additionally, the divider/square root formation unit 152 also receives information defining which bit of the quotient to calculate next. Finally, the divider/square root formation unit also receives the divisor word. This is not provided if a square root function is performed. Not shown, but also provided to this unit is information defining whether a square root or dividing operation is to be performed and also whether or not single precision point or double precision point processing is to be used.

In the divide case, this block is simply a multiplexer choosing either + or − the divisor or 0, depending on the selected quotient bit. The result of this is passed to the carry save adder 154 to add to the current remainder word.

In the square root case, the value added to the remainder is determined as a function of the current quotient representation.

The block calculates the inner values as set out in table 4 by inverting only if complementing is required. This occurs when the selected quotient bit is +1 and is corrected for by the qplus1 input to the carry save adder 154 from the quotient selection logic block. When complementing in the single precision case, bits 28 to 0 are set to zero before driving the output of the block. When the correction is added in the carry save adder, this is done to bit 29. The quo_p and quo_n buses have root multiple bits set already so in the square root case only multiplexing or setting to zero need occur.

The qabs signal arrives later than the qsign signal and so should be used as late as possible.

The on the fly quotient decoder 156 is arranged to calculate the new values of the positive and negative quotient words with the root multiple bits set in readiness for the divider square root formation unit in the next execution unit. This block also determines which quotient bit is to be determined next.

The on the fly quotient decoder 156 receives in addition to the inputs $q_{abs}$ and $q_{sign}$, the positive and negative quotients. Additionally, a quotient bit position indicator is also received. In this embodiment of the present invention, the positive and negative quotient values are propagated as root multiples and these bits are ignored during quotient decoding by referring to the positional bit and then regenerated during the process. The $q_{abs}$ information is used as late as possible.

This block is also arranged to shift the position bit one place to the right.

The on the fly quotient decoder block 156 provides a quotient bit positional indicator output which is output to the next stage which indicates which bit is to be calculated next. In particular, this bit will be input to the on the fly quotient decoder block in the next execution unit.

Positive and negative quotient representations are also provided which are output to the on the fly quotient decoder block of the next execution unit. Additionally, a drp and drn output is provided which gives the divisor or root multiple to be added to the upper bits in the next execution unit. As will be discussed, this output is input to the parallel remainder upper execution unit 158 of the next execution unit. In particular, this output gives the divisor or root multiple to add to the upper bits when the next selected quotient bit is plus or minus 1. This is simple in the divide case but in the square root case the root multiple for the next step needs to be calculated. This involves determining the current root multiple and then generating the possibilities for the next step.

The $q_{sign}$ output of the quotient selection logic block 150 arrives early as it is simply an inversion of an input and determines whether the current quotient bit is plus or minus 1. The $q_{abs}$ signal arrives much later and determines whether the magnitude of the quotient bit is zero or not. If not, then the value selected by the $q_{sign}$ input is selected. Accordingly, two values are initially calculated for the drp and for the drn output based upon the value of $q_{sign}$. One of these pairs is selected depending on the value of $q_{abs}$.

The calculation of drp and drn will now be described. The algorithm for generating the drp and drn signals are similar to the algorithm carried out by the on the fly quotient decoder decoder except that possibilities are generated for addition in the next step. Therefore in the divide case, bits of the divisor are driven onto the drp and drn buses, the divisor bits being inverted for the drp bus.

For the square root case a complex function of the current positional bit (being to the left, right or on the current bit) and the value of the quo_p and quo_n busses for the current bit as well as qabs and the qsign are used. Referring to table 4, if the current positional bit is one or two places to the left of the bit in question then the drn word generated will have a root multiple bit set.

The generation is arranged to generate two possibilities for each of the drp and drn outputs and to use qabs to select between them. The generation of these signals use qsign as late as possible. The table below shows the generation of four signals: pz, pnz, nnz and nz. For each bit it is determined if the current positional bit is to the left, on the bit or to the right of the bit. Next this information is used to select the next positive and negative quotient bit if the current quotient bit turns out to be zero or non-zero. In the divide case, all the selected bits are equal to the current divisor bit. $q_{abs}$ is used to select the current positive and negative quotient bits and then all the root multiple bits. This is only in the square root case.

The selection of the next positive and negative quotient bits is set out in Table 5 below.

If the current positional bit is one or two bits to the left of the bit in question, the drn word generated will have a root multiple set and if the current positional bit is two bits to the left then the drp word will have a root multiple bit set.

The pnz and pz signals are inverted before driving the final drp output. This is because a subtraction is actually performed when the current quotient bit is 1.

To generate these signals selection is performed using the qsign signal and the final selection will be based on the qabs signal.

The circuitry for providing the drn and drp signals will be described in more detail hereinafter.

The parallel remainder upper execution block 158 will now be described. This block provides the same operation as the divider square root formation and carry save adder path, but only on the upper bits. In particular, this is formed so that the top three bits can be passed through a carry propagate adder contained within the parallel remainder upper execution unit ready for the quotient selection logic block for the next stage. As a result of the operation, a few of the upper redundant remainder bits are also calculated. This block is on the critical path of the execution unit.

This block has the following inputs: The remainder from the carry propagate adder of the parallel remainder execu-

TABLE 5

| Opcode | pos_to_left | quo_pos | qsign | Pos_p_rm | Pos_n_rm | P_nz | p_z | n_nz | n_z | Comment |
|---|---|---|---|---|---|---|---|---|---|---|
| DIV | X | X | X | x | X | Div | Div | div | div | Select divisor bit regardless |
| SQRT | 1 | X | X | a | b | a | a | b | b | If the positional bit is to the left of the cur rent bit then perform no quotient decoding and set all bits to zero to remove the root multiple bits on the input. |
| | 0 | 0 | 0 | x | x | n | P | n | n | The positional bit is to the right so multiplex the input bits as required. |
| | 0 | 0 | 1 | x | x | p | p | p | p | |
| | 0 | 1 | 0 | x | x | 1 | 0 | 0 | 1 | The current bit is being calculated so set the new bits as required. |
| | 0 | 1 | 1 | x | x | 1 | 0 | 0 | 1 | |

The inputs are as follows: the p and n current positive and negative quotient bits for the current bit position; the relevant divisor bit; pos_to_left—the current positional bit is to the left of the current bit when set and is taken from the relevant bit of pos_or input; and pos—the positional bit for the bit being calculated. Additionally, there are the inputs pos_p_rm and pos n_rm. Pos_p_rm is set if the positional bit is two places to the left and pos_n_rm is set if the current positional bit is either one or two places to the left.

This information is used to generate the positive zero p_z and positive non-zero p_nz positive quotient outputs and negative non-zero n_nz and negative zero n_z negative quotient bits output.

Pz is selected as the drp output current quotient bit is zero, pnz is selected as the drp output if the current quotient bit is not zero, nz is selected as the drn output if the current quotient bit is zero and nnz is selected as the drn output if the current quotient bit is non zero.

tion block of the previous execution unit, denoted as r1 and r2 (see FIG. 7) of the remainder. Bit r0 is not required due to the final left shift. Additionally, the block receives the bits s3 and s4 of the remainder sum lower bits and bits c3 and c4 of the remainder carry lower bits from the corresponding block in the previous execution unit. The unit also receives the drp and drn signals. There is also a partial sum input to push some logic into the previous stage. The output of the block is "p".

Figure 10A:
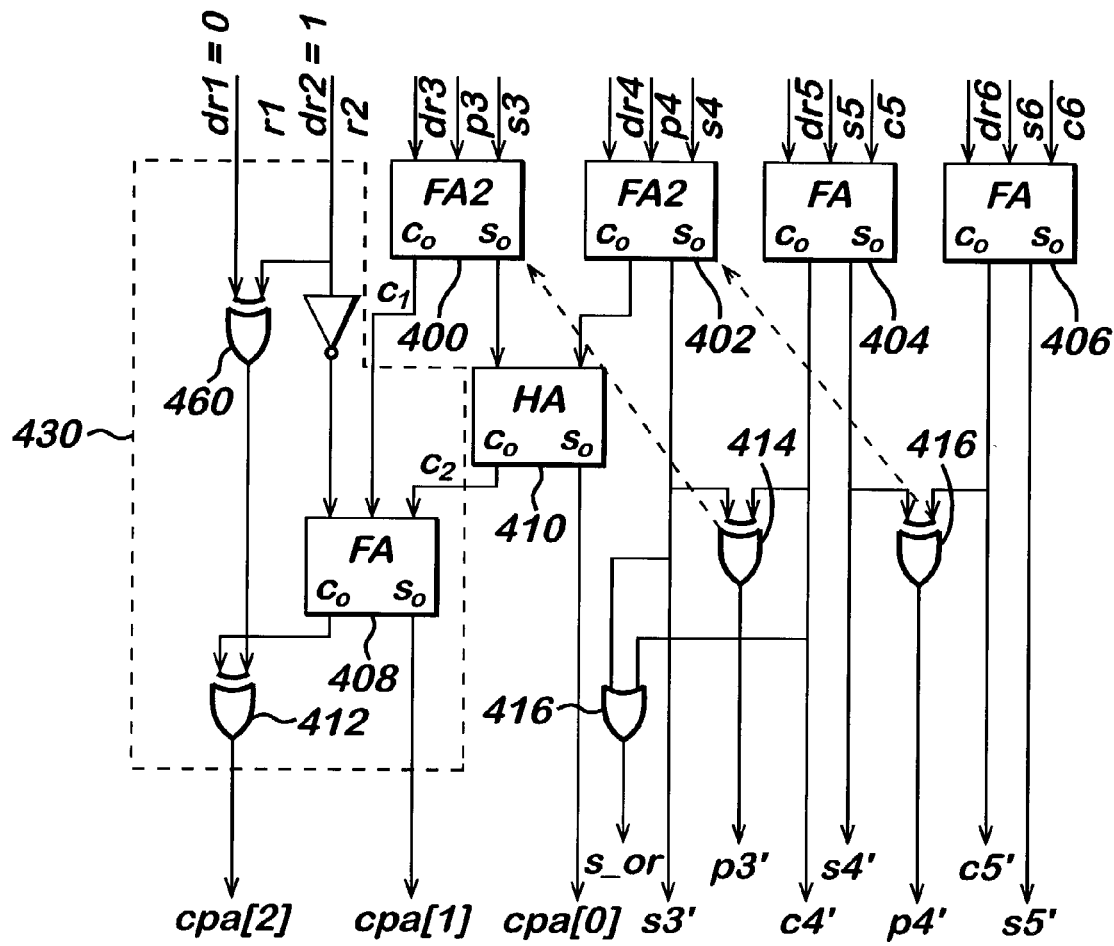

In this document, as far as the rem_cpa is concerned, bit 55 is r0, bit 54 r1 and so on. As far as rem_sum is concerned, bit 52 is s3, bit 51 s4 and so on. As far as rem_carry is concerned, bit 51 is c3, bit 50 c4 and so on. S3-6 and c3-6 are shown in FIG. 10. S3, s4, c3 and c4 are used by the carry propagate adder. S5, s6, c5 and c6 are used for p generation.

The function of the parallel remainder upper execution unit will now be described with reference to FIGS. 6 and 7. FIG. 6 illustrates the format of the remainder. FIG. 7 illustrates how the upper remainder bits are calculated. As can be seen from FIG. 6A and FIG. 6B, the remainder effectively comprises a sum and a carry. However, in embodiments of the present invention, the top three bits are provided by the remainder calculated from the carry propagate adder. As will be described in relation to FIG. 7, the result provided by the carry propagate adder takes into account various of the sum and carry values.

The sum part of the remainder can be represented by a first bit r0 indicating the sign of the remainder. The next two bits, ie bits 54 to 53 (r1, r2) represent the bits output by the carry propagate adder. The sign is also provided by the carry propagate adder. A point is provided between bits r1 and r2 of the carry propagate adder output (see FIG. 7). This is because generally normalized numbers are being dealt with. Bits 52 to 0 represent the normal sum bits. The second line represents the carry line and comprises bits 51 to 0. Bit 52 of the carry remainder is 0. This carry has already been added into the carry propagate adder.

It is worth emphasizing that the remainder provided by the carry propagate adder result has been precalculated in the previous stage so it is ready for use by the quotient selection logic in the current execution unit.

At the end of each stage, the remainder is shifted left one place as is shown in FIG. 6B. The representation shown in FIG. 6 is such that the carry remainder for bit n and the sum remainder for bit n are the sum and carry out of bit n. Accordingly, carry bit n is more significant. Accordingly, when the remainder is shifted left one place, the carry value is actually shifted two places so that all the bits which are summed together have the same significance.

Thus, as shown in FIG. 6B, the first bit of the sum, representing the sign bit in the previous stage, is discarded. The first three bits, bits 55 to 53 are again the precalculated remainder provided by the carry propagate adder. This is followed by sum bits 52 to 0. Because of the left shifting, a zero is added to the end. The second line which represents the carry line has been shifted two bits to the left so that corresponding values of the carry are aligned with the corresponding values of the sum. In particular, sum bit 52 is aligned with carry bit 51 and so on. As the carry remainder has effectively been shifted two places to the left, two zeros are added to the end of the results.

The calculation of the upper bits provided by the carry propagator adder is now described in relation to FIG. 7. The remainder comprises values $r_o$ (the sign), $r_1$ (1) and $r_2$ (½). These are the carry propagate adder remainder values calculated in the previous stage. The remainder also consists of sum bit 3 and sum bit 4 and carry bit 3 and carry bit 4. It should be appreciated that the first bit of the remainder are zero is superfluous as the result is shifted one place to the left.

This remainder value is added to the current divisor or root multiple value. This consists of bits $dr_0$, $dr_1$, $dr_2$, $dr_3$ and $dr_4$. The 3 bit carry propagate adder is arranged to add together the value of the remainder and the root multiple/divisor. In particular, it takes into consideration the first three bits of the remainder and the first three bits of the divisor or root multiple. The carry input is also provided which takes into account bits $s_4$, $c_4$ and $dr_4$. The results of this carry are input to the carry propagate adder. The final result provided by the carry propagate adder takes into account the value of the carry. The result consists of 4 bits r'0, r'1, r'2 and r'3. This result is then shifted left one place. This then provides the next three bits to the carry propagate adder in the next execution unit. This result is also provided to the quotient selection logic 150 in the next execution unit.

The parallel remainder execution block implements the remainder generation described in relation to FIGS. 6 and 7. In summary, the sum is calculated for all three possibilities of the quotient bit and then the result from the quotient selection logic is used to select one of them. As shown in FIG. 6, the two bits of the divisor/root multiple to add in each are constant for each quotient bit. Therefore, an individual optimized circuit is used for +1, 0 and −1.

Figure 8:
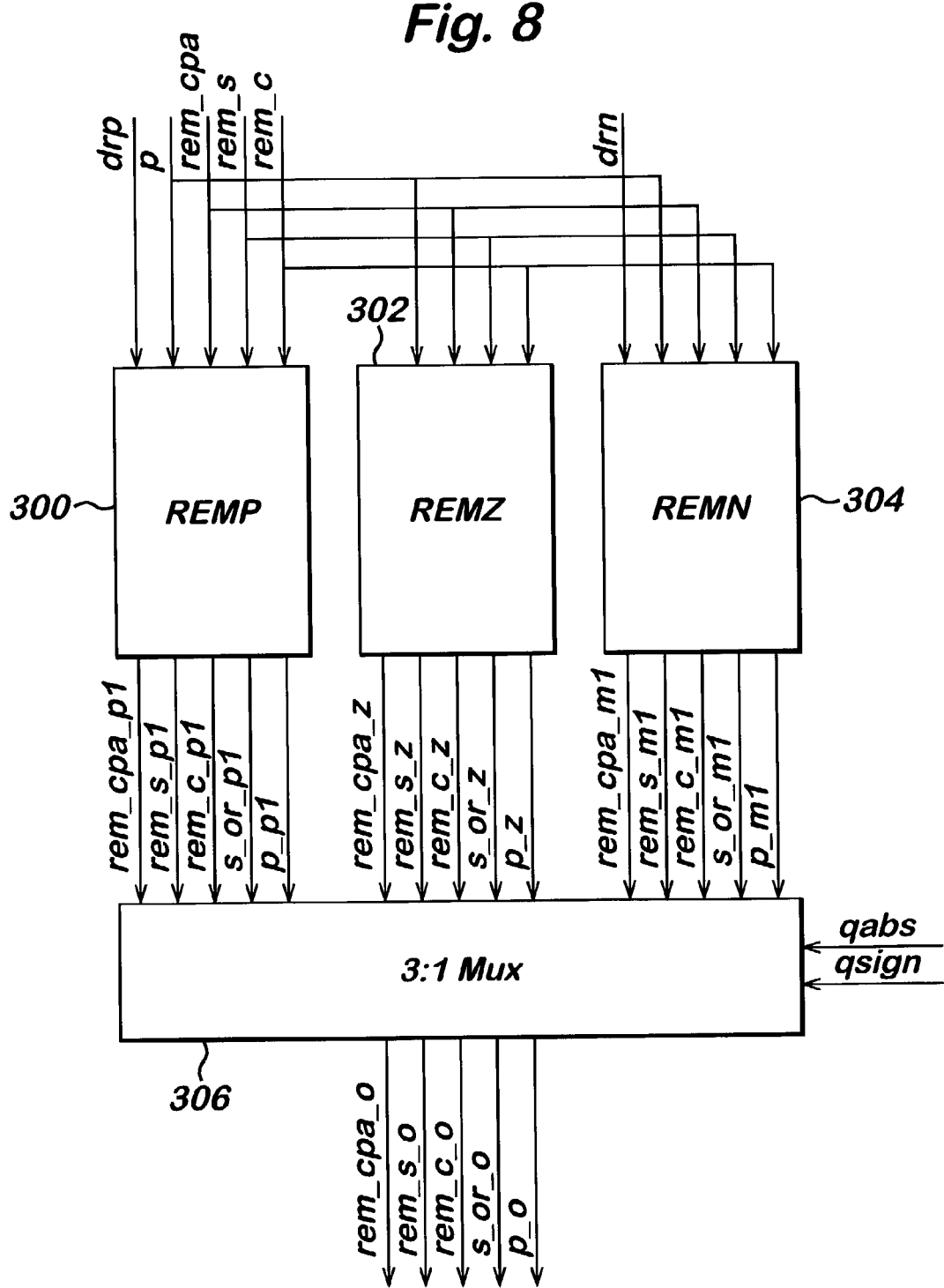
FIG. 8 shows a block diagram of the parallel remainder upper execution unit.

Reference is made to FIG. 8 which shows the parallel remainder upper execution unit in more detail. As can be seen, the unit comprises a first unit 300 which calculates the sum if the quotient bit is positive. The second unit 302 calculates the sum if the quotient bit is 0. The final unit 304 calculates the value if the quotient bit is −1.

Each of these units 300 to 304 receives the following inputs: p, rem_cpa (the remainder bits r1 and r2 calculated by the carry propagate adder), rem_s (bits s3 to s 6) and rem_c (bits c3 to c6). Additionally, the first unit receives the input drp (this represents the divisor or root multiple to add if qi=+1) and the third unit 304 receives the input drn (this represents the divisor or root multiple to add if qi=−1).

Each unit provides a set of outputs to a multiplexer 306. The output of the multiplexer is controlled by signals $q_{abs}$ and $q_{sign}$. If the quotient bit is +1, then the output of the first unit 300 is selected as the output of the multiplexer 306. Likewise, if the quotient bit is 0, then the bits from the second unit 302 are selected whilst if the quotient bit is −1, then the output of the third unit 304 is selected.

The output of each of the units comprises a carry propagate adder remainder value (bits 55 to 53), a sum remainder value (bits 52 to 50) and a carry remainder value (bits 51 to 50). Additionally, there is an output which represents the result of an OR operation on the sum and carry (s2 or c2). This logic is thus removed from the quotient selection logic block of the following execution unit. This latter result is used by the quotient selection logic unit of the next unit as discussed above. Finally, there is a value which is p.

Figure 9A:
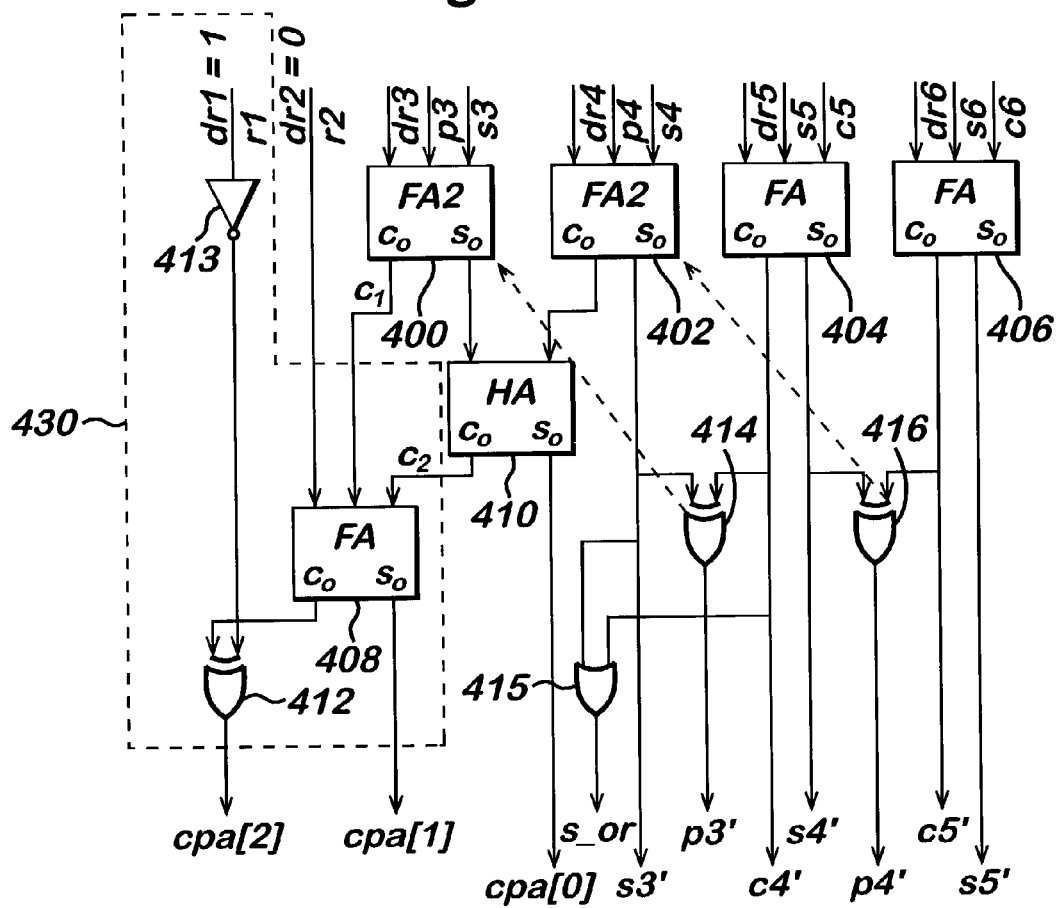
FIGS. 9 to 11 show in more detail, the units of the parallel remainder upper execution unit of FIG. 8.

Reference is now made to FIG. 9 which shows the structure of the first unit 300. The unit comprises four full adders 400, 402, 404 and 406. The first and second adders are as will be described in more detail hereinafter split across the stages. The first full adder 400 is arranged to receive the inputs dr3, p3 and s3. The second adder 402 receives the inputs dr4, p4 and s4. The third full adder 404 receives the input dr5, s5 and c5. The fourth full adder receives the input dr6, s6 and c6. Each of the full adders provides a carry output and a sum output. The carry output c1 of the first adder is input to a fifth full adder 408. The sum output of the first full adder 400 is input to a half adder 410. The carry output of the half adder 410 provides the carry output c2. The full adder 408 also receives the input r2. As dr2 is equal to 0, the logic can be simplified. The carry output of the full adder 408 is input to one gate of an exclusive OR gate 412. The exclusive OR gate 412 also receives from an inverter 413 the inverted value of r1. As dr1 is equal to 1, the logic can again be simplified. The output of the exclusive OR gate 412 provides the carry propagate adder [2] output. The sum output of the fifth full adder 408 provides the carry propagate adder [1] output. The sum output of the half adder 410 provides the carry propagate adder [0] output. cpa [2] cpa [1] and cpa [0] represents the three carry propagate adder bits.

The sum output of the second full adder 402 provides the value s3'. The sum output of the second full adder 402 is input to a second exclusive OR gate 414. This second exclusive OR gate also receives the carry output from the third full adder 402. The second exclusive OR gate 414 provides the output p3'. The carry output of the third full adder 404 also provides the output c4'. The sum output of the third full adder 404 provides the output s4'. The sum output of the third full adder 404 is also input to a third exclusive OR gate 416. The third exclusive OR gate 416 also receives the carry output of the full adder 406. The output of the third exclusive OR gate 416 provides the output p4'. The carry output of the fourth full adder 406 provides the value c5' whilst the sum output of that full adder provides the value s5'.

An OR gate 416 is provided which receives the sum output of the second full adder 402 and the carry output of the third full adder 404. This provides the s_or output discussed previously.

Figure 9B:
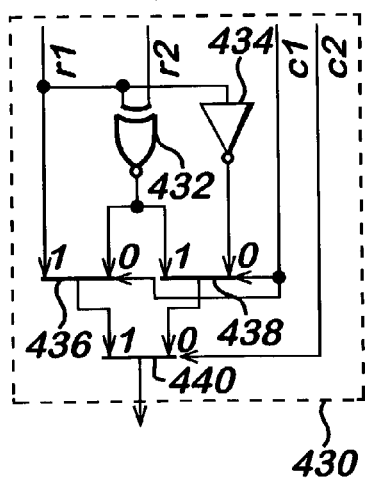

Reference is now made to FIG. 9B which shows how block 430 can be optimized so as to be implemented in two logic levels only. This block comprises an exclusive NOR gate 432 and an inverter 434. Additionally, first and second multiplexers 436 and 438 are provided. The exclusive NOR gate 432 receives the input r1 and r2. The output of the exclusive NOR gate 432 provides an input to the first multiplexer 436 and to the second multiplexer 438. A second input to the first multiplexer 436 is provided by the signal r0. c1 provides the control signal for the first multiplexer 436.

The signal r0 is input to the inverter 434, the output of which provides the second input to the second multiplexer 438. The second multiplexer 438 is controlled by the signal c1. The output of the first and second multiplexers 436 and 438 are each input to a third multiplexer 440 which is controlled by the signal c2.

Figure 9C:
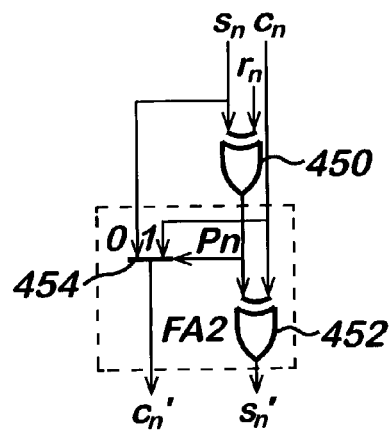

FIG. 9C schematically shows the structure of the first and second full adders 400 and 402. In the arrangement shown in FIG. 9C the exclusive OR gate is shown as being before the full adder. In embodiments of the present invention the exclusive OR gate (which is equivalent to gate 414 and 416) will be provided in the preceding execution unit. The arrangement has a first exclusive OR gate 450 which has an input sn and an input rn. The output of that first exclusive OR gate 450 is input to a second exclusive OR gate 452. The output of this first exclusive OR gate 450 is the output pn. This signal is additionally used to control a multiplexer 454. The multiplexer 454 receives the input cn and sn. The output of the first multiplexer 454 is cn'. The second exclusive OR gate 452 also receives an input from cn. The output of the second exclusive OR gate 454 provides the output sn'.

Reference is now made to FIG. 10 which shows the arrangement of the third block 304. The arrangement of the third block is similar to that of the first block apart from the structure of the part 430'. The exclusive OR gate 412 receives an input from the output of the further exclusive OR gate 460 which receives an input from r1 and r2. The logic can again be simplified as dr1 is 0 and dr2 is 1. The third input to the third adder 408 is the inverted version of r2.

Figure 10B:
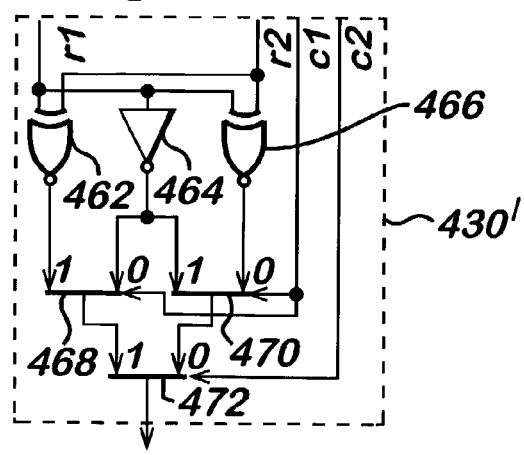

Block 430 can be optimized as shown in FIG. 10B. The arrangement shown in FIG. 10 comprises an exclusive NOR gate 462 which receives a first input r1 and a second input r2. An inverter 464 is provided which inverts r1. An exclusive OR gate 466 is provided which receives an input from r1 and an input from r2. A first multiplexer 468 is provided which receives an input from the output of the exclusive NOR gate 462 and the output of the inverted 464. The first multiplexer is controlled by the signal c1.

A second multiplexer 470 is provided which receives an output from the inverter 464 and the output of the exclusive OR gate 466. Again, this multiplexer is controlled by the signal c1. The outputs of the first and second multiplexers are input to a third multiplexer 472 which is controlled by the signal c2. The output of the third multiplexer 472 provides the signal cpa[2].

Reference is now made to FIG. 11 which shows the structure of the second unit 302. This unit is much simpler than the first or third unit. The second unit comprises first to third half adders 480 to 484. A full adder 486 is also provided. The first half adder 480 receives the inputs c3 and s3. The second half adder receives the inputs c4 and s4. The carry output of the first half adder 480 provides the first carry output c1 which is input to the full adder 486. The sum output of the first half adder 480 is input to the third half adder 484. The carry output of the second half adder 482 is input to the third half adder. The sum output of the second half adder 482 provides the output s3 '.

The carry output of the third half adder 484 is input to the full adder 486. The sum output of the third half adder 484 provides the output cpa[0]. The full adder 486 also receives the input r2. The carry output of the full adder 486 is input to an exclusive OR gate 488 which also receive the input r1. The output of the exclusive OR gate 488 is cpa[2]. The sum output of the full adder 486 provides the output cpa[1].

Figure 11A:
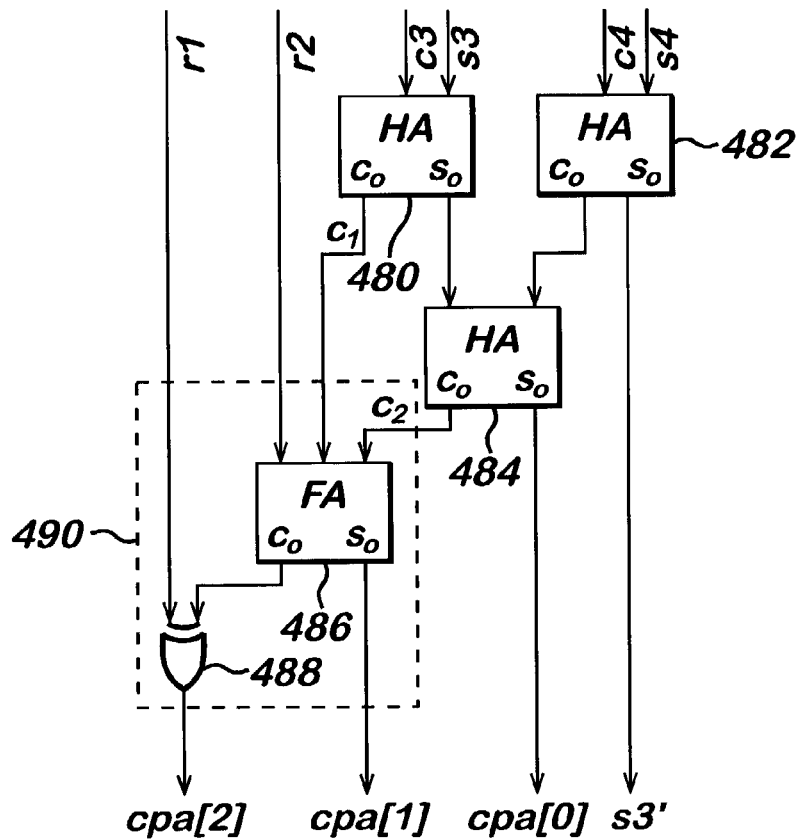
Figure 11B:
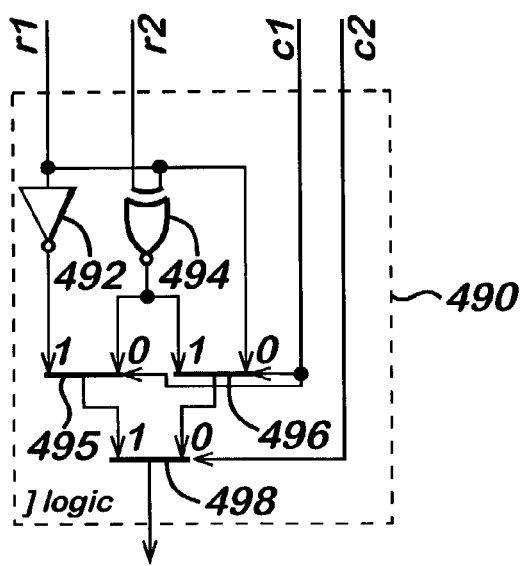

FIG. 11B shows how the part of the block 490 of FIG. 11A can be optimized to have two logic levels. The part of the circuit 490 comprises an inverter 492, an exclusive OR gate 494 and first to third multiplexers 495, 496 and 498. r1 is input to the first inverter 492, the output of which is input to the first multiplexer 495. r1 is also input to the exclusive OR gate 494 along with the input r2. The output of the exclusive OR gate 494 is input both to the first multiplexer 495 and to the second multiplexer 496. The second multiplexer 496 also receives the input r1. The first and second multiplexers 495 and 496 are controlled by the signal c1.

The output of the first and second multiplexers 495 and 496 is input to the third multiplexer 498 which is controlled by the signal c2.

It should be appreciated that for clarity in FIGS. 9B, 10B and 11B the output cpa [1] is not shown.

For certain operand values, the operation carried out by the iteration block shown in FIG. 3 is bypassed. In particular, where the divisor has the value $+/-1 \times 2^n$, a look up table is used to determine the result. The floating point vector unit 108 is arranged to receive the opcode for the operation and the value of the dividend and divisor. This may be via a direct connection from the register files 104 or the controller 102 or from the source which provides that information to those elements. If the value of the divisor is $+/-1 \times 2^n$, the floating point vector unit is arranged to look at a look up table (referenced 107 in FIG. 3). The look up table provides information which indicates that the result of the division should be the dividend with the sign and exponent modified as necessary. The look up table can be used for values such as divide by +0 or −0, +/− infinity or square root of +/−0 or +/− infinity, +/−1, or negative numbers. In that case, the look up table would return an error message or the like. Signaling or quiet NaNs (not a number) (which are defined in IEEE standard number 754) may also have entries in the look up table. In preferred embodiments of the invention, the look up table would indicate that an error message should be returned.

The look up table can also have entries for certain values of dividend such as +/− infinity, +/−0 or the like.

In summary, the look up table can provide the actual output such as an error message or the like or how the result is obtained, for example that the result is a simply modified version of the dividend. The look up table may be used to control all operations. For example in the case of a normal divide operation, the look up table can indicate that the normal iteration method is to be used and cause the arrangement of FIG. 3 to be used.

It should be appreciated that in alternative embodiments of the present invention, the iteration units may process the data but the result is taken from the results provided by the look up table. In alternative embodiments of the invention, the look up table may be provided in the controller, upstream of the controller or in any other suitable location.

Figure 14:
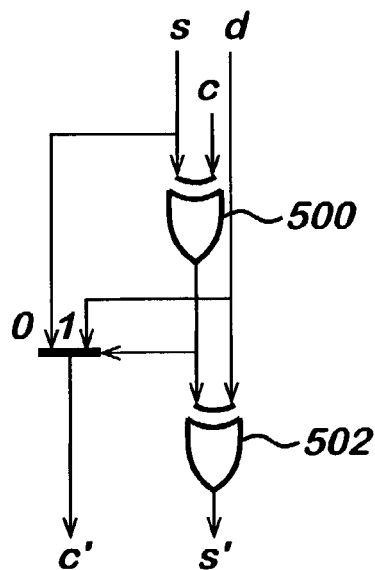
FIG. 14 shows the structure of the carry save adder.

The carry save adder 154, which is shown in FIG. 14, is arranged to add the output from the divide/square root unit 152 to the current redundant remainder and so performs 3:2 compression. The sum and carry words are aligned on input to this block, the necessary iterative shift being performed here.

Figure 13:
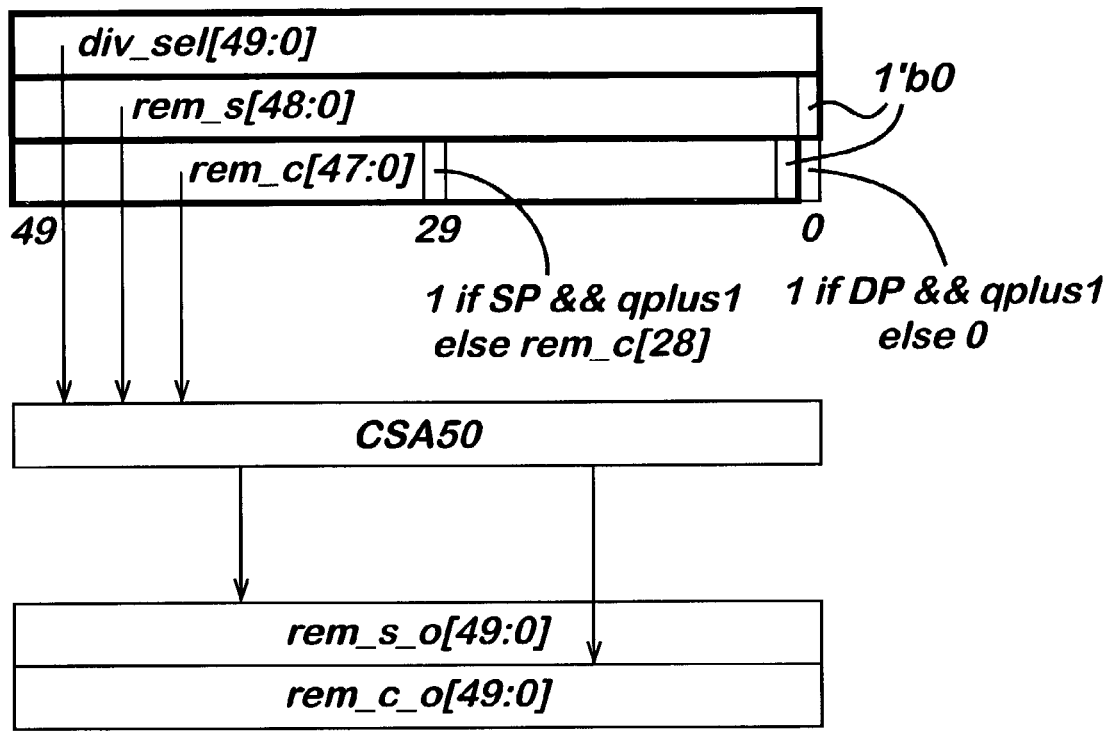
FIG. 13 illustrates the operation of the carry save adder, shown in FIG. 5.

In more detail, this block receives the fractional part of the divisor or the currently determined root multiple from the divider/square root formation unit 152, that is div_sel. In the example shown in FIG. 13, this is div_sel[49:0]. The carry save adder adds this to the current sum/carry representation of the partial remainder which it receives as inputs. In the example shown in FIG. 13, this is rem_s [48:0] and rem_c [47:0]. The previously calculated remainder is shifted one place to the left, that is both the sum and the carry components, when it is input to the carry save adder block.

The qplus1 input is received from the quotient selection logic. If this input has been set, then the root multiple/divisor input has been inverted but not incremented. Accordingly, a 1 must be added to correct for this.

The result of the carry save adder operation is output by the carry save adder. In the example shown in FIG. 13, this is rem_s_o [49:0] and rem_c_[49:0].

Reference is made to FIG. 14 which shows an implementation of a carry save adder cell. In preferred embodiments of the invention, the carry save adder is an array of 3:2 compressors or full adders. The sum and carry inputs are available early but the div_sel input arrives later. The full adder cell used in embodiments of the invention is arranged to accept one input later than the other two.

The carry save adder cell comprises a first exclusive OR gate 500 which receives a sum input s and a carry input c. The output of the first exclusive OR gate 500 is connected to the input of a second exclusive OR gate 502 which also receives a div_sel input. The output of this second exclusive OR gate 502 provides the sum output s'. A multiplexer 504 is provided which receives the sum input s and the div_sel input. This multiplexer is controlled by the output of the first exclusive OR gate and provides the carry output c'.

Reference is made to FIG. 12 which illustrates hoe the value provided by Table 5 can be calculated. The circuitry of FIG. 12 is included in the on the fly quotient decoder. It should be appreciated that the circuitry has a bit slice for each bit. Accordingly, the bit slice provided in each of the execution units can be modified. Reference is made to the Table 6 below:

TABLE 6

Figure 12A:
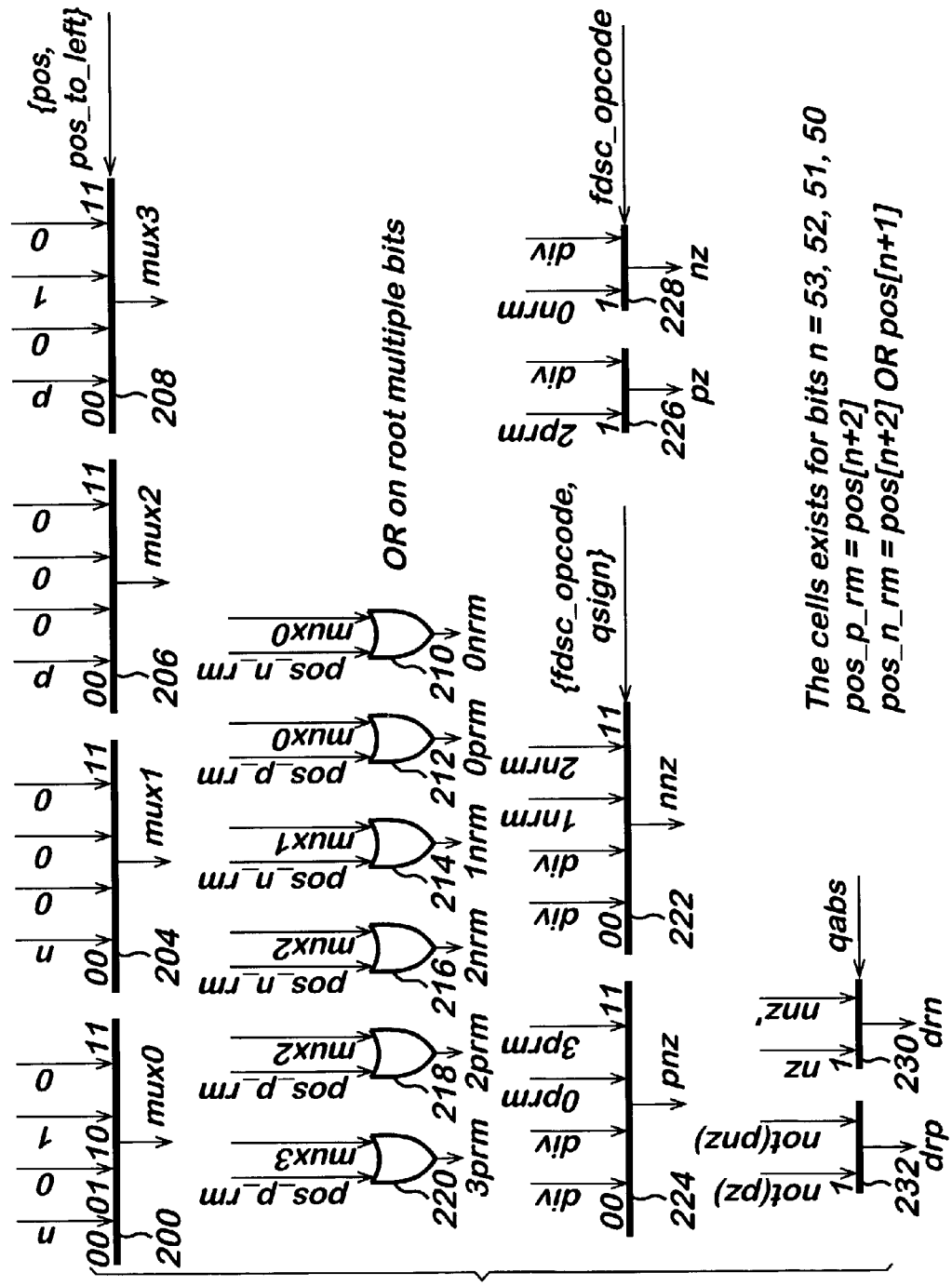
FIG. 12a illustrates the generic generation of the drp and drn signals.
Figure 12B:
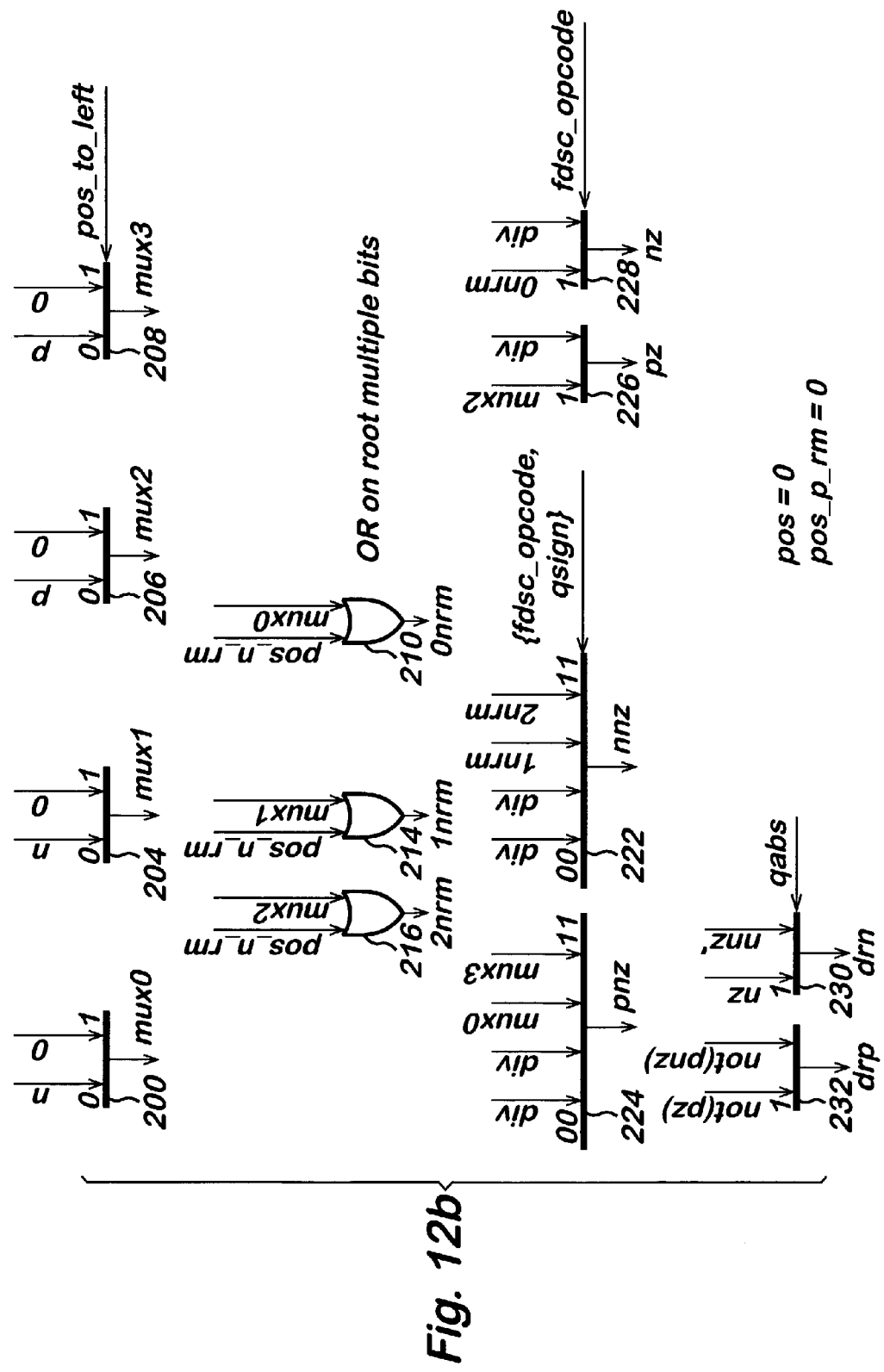
FIG. 12b illustrates the generation of the drp and drn signals, showing an 0x0xx bit slice.

| Execution unit | Bit position | Pos | pos_to_left 52 | pos_p_rm | pos_n_rm | Cell used |
|---|---|---|---|---|---|---|
| EU1 | 53 | 0 | quo_pos [54] | 0 | Quo_pos [54} | 0x0x |
|  | 52 | quo_pos [52] | quo_pos [54] | quo_pos [54] | quo_pos [54] | Xxxx |
|  | 51 | 0 | quo_pos [54] quo_pos [52] | 0 | quo_pos [52] | 0x0x |
|  | 50 | quo_pos [50] | quo_pos [54] quo_pos [52] | quo_pos [52] | quo_pos [52] | Xxxx |
| EU2 | 53 | quo_pos [53] | 0 | 0 | 0 | X000 |
|  | 52 | 0 | quo_pos [53] | 0 | quo_pos [53] | 0x0x |
|  | 51 | quo_pos [51] | 0 | quo_pos [53] | quo_pos [53] | X0xx |
|  | 50 | 0 | quo_pos [53] quo_pos [51] | 0 | quo_pos [51] | 0x0x | xxxx cells allow all the inputs to vary and so are as shown in FIG. 12a. The three other cells are shown in FIGS. 12b, c and d.

Reference is made first to FIG. 12A which shows a generic diagram of the circuitry which can be provided for bits n=53, 52, 51 and 50. Four multiplexers 200, 204, 206 and 208 are provided. The first multiplexer 200 has first to fourth inputs as follows: n, 0, 1, 0. The second multiplexer 204 has first to fourth inputs as follows: n, 0, 0, 0. The third multiplexer 206 has first to fourth inputs as follows: p, 0, 0, 0. The fourth multiplexer 208 has first to fourth inputs: p, 0, 1, 0. Each of the first multiplexers 200 to 208 is controlled by two signals, pos and pos-to-left.

The first input is selected when both of these signals have the value 0. The fourth input is selected when both of these inputs have the value 1. The third input is selected when the value of pos is 1 and the value of pos-to-left is 0. The second input is selected if the value of pos is 0 and the value of pos-to-left is 1.

An array of OR gates 210–220 are provided which receive respective ones of the outputs of the multiplexers. The first OR gate 210 receives an output from the first multiplexer 200 and the signal pos_n_rm. The output of the first OR gate 210 is 0 nrm, that is the 0 bit of the negative root multiple. The second OR gate 212 receives the output of the first multiplexer 200 and the value pos_p_rm. The output of the second OR gate 212 is 0 prm, that is the 0 bit of the positive root multiple. The third OR gate 214 receives the output of the first multiplexer and the value pos_n_rm, with the output being 1 nrm. The fourth OR gate 216 receives the output of the third multiplexer 206 and the signal pos_n_rm. The output of this fourth OR gate 216 is 2 nrm. The fifth OR gate 218 receives the output of the third multiplexer 206 and the input pos_p_rm. The sixth OR gate 220 receives the output of the fourth multiplexer 208 and the input pos_p_rm. The output of the fifth OR gate is 2 prm and the output of the sixth OR gate is 3 prm.

This is followed by a further two multiplexers. The fifth multiplexer 224 receives the following first to fourth inputs: div (the divisor bit n), div, 0 prm and 3 prm. The values of 0 prm and 3 prm are provided by the outputs of the second OR gate 212 and sixth OR 220. The sixth multiplexer 222 has the inputs div, div, 1 nrm and 2 nrm as the first to fourth inputs respectively. The inputs to the fifth and sixth multiplexers 224 and 222 are selected in accordance with the opcode indicating whether or not the operation is a square root or division operation and the value of qsign. When both of these signals have the value 0, then the first input is selected. When the value of the opcode is 1 and qsign is zero, then the third input is selected. If the opcode is zero and qsign is 1, then the second input is selected. The fourth input is selected if both of the signals have the value 1.

Seventh and eighth multiplexers 226 and 228 are provided. The seventh multiplexer 226 has a first input 2 prm from the fifth OR gate 218 and a second input div. This multiplexer is controlled by the value of the opcode indicating if the operation is a square root or division operation 2 prm is selected as the output if the value of the opcode is 1. With the eighth multiplexer, it has a first input 0nrm from the first OR gate 210 and the input div. The 0nrm input is selected if the opcode, which controls that multiplexer, is 1.

The output of the fifth multiplexer gives the signal p_nz whilst the output of the sixth multiplexer gives the signal n_nz. The output of the seventh multiplexer gives the signal p_z and the output of the eighth multiplexer gives the value n_z. In this regard, reference is made to Table 5.

The arrangement has two further multiplexers 232 and 230. The ninth multiplexer 232 provides the output drp and has a first input which is not (pz) and a second input which is not (p_nz). The ninth multiplexer 232 is controlled by the $q_{abs}$ signal and when the value thereof is 1, the input not (pz)is selected as its output. Finally, the tenth multiplexer 230 has the input nz and n_nz. Again this multiplexer is controlled by the signal QABS which, when this signal has the value 1 causes the signal nz to be output. The output of the ninth multiplexer 232 is a signal drp and the output of the tenth multiplexer 230 is a signal drn. It should be appreciated that the inputs to the ninth and tenth multiplexers 232 and 230 are from the fifth to eighth multiplexers, with the use of inverters (not shown) for the inputs to the ninth multiplexer 232.

Reference will now be made to FIG. 12B which illustrates the 0x0x bit slice. The first to fourth multiplexers 200–208 have been simplified and are controlled by the signal pos_to_left. This is because the signal pos has a constant value of 0. Accordingly, the inputs to the multiplexers have been simplified to be n and 0 in the case of the first and second multiplexers and p and 0 in the case of the third and fourth multiplexers. n is selected as the output of the first and second multiplexers if the signal pos_to_left has the value 0 and 0 is selected as the output if that signal has the value 1. Likewise, p is selected as the output of the third and fourth multiplexers if the signal $pos_{13}$ to_left is 0 and if that signal has the value 1, then the output 0 is provided by the third and fourth multiplexers.

The number of OR gates can be reduced to three as the second, fifth and sixth OR gates can be left out.

The fifth multiplexer can be simplified with the inputs 0 prm and 3 prm replaced by the outputs of the first and fourth multiplexers 200 and 208 respectively. This is possible because pos_p_rm is always equal to zero. The seventh multiplexer 226 can also be simplified in that the input 2 prm is replaced by the output of the third multiplexer 206.

The ninth and tenth multiplexer are unchanged. Thus, the first to fourth multiplexers are simplified and some of the OR gates can be omitted.

Figure 12C:
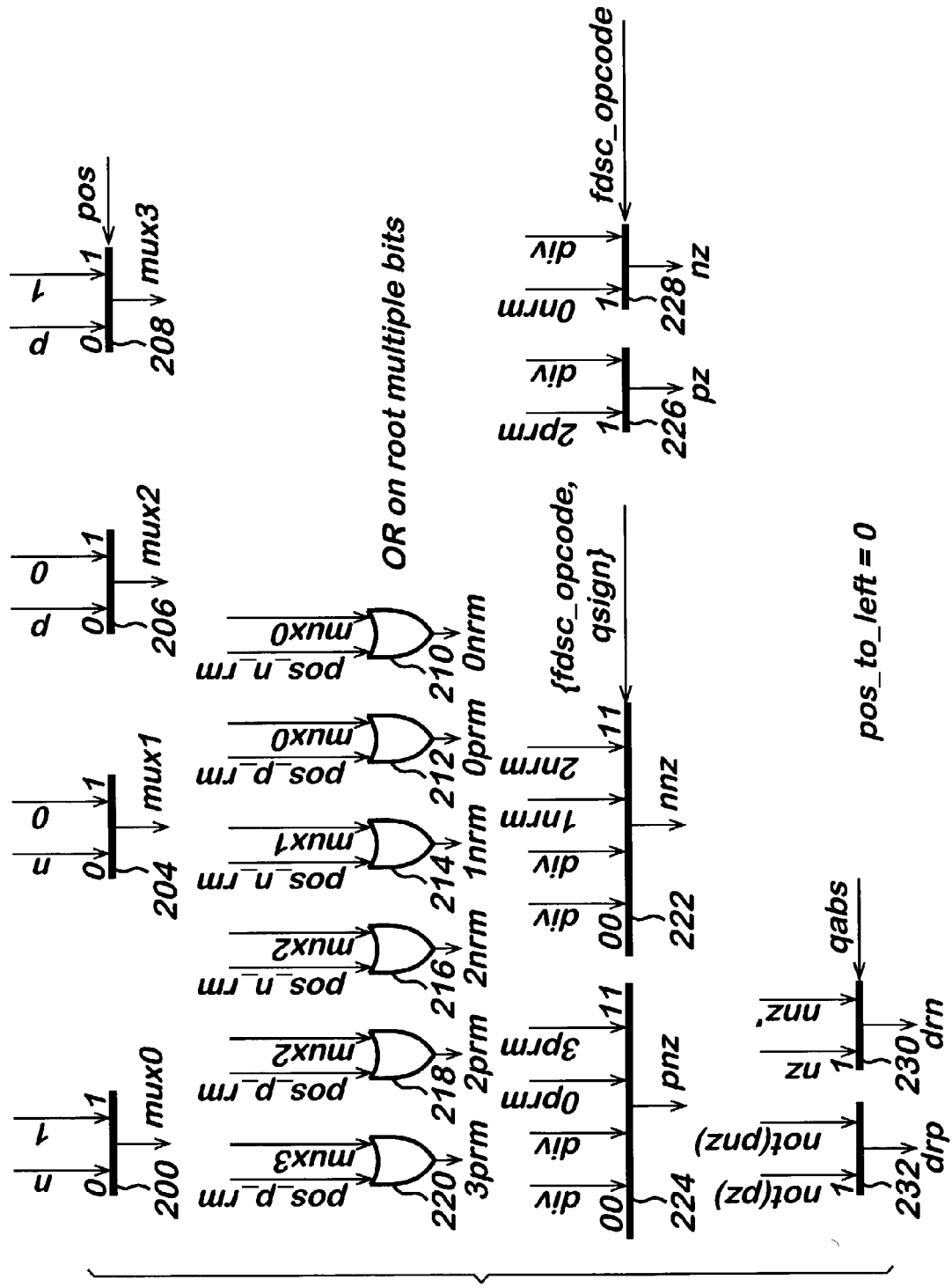
FIG. 12c illustrates the generation of the drp and drn signals, showing an x0xx bit slice.

Reference is made to FIG. 12C which shows the x0xx bit slice. Less simplification is possible in this arrangement as compared to FIG. 12B. In particular, the OR gates and fourth to tenth multiplexers are as shown in FIG. 12A. However, the first to fourth multiplexers can be modified to have only two inputs. This is because the signal pos_to_left which is used to control the first to fourth multiplexers in FIG. 12A always has the value zero. Accordingly, the first input of the first multiplexer is n and the second input is 1. The first input to the second multiplexer 204 is n and the second input is zero. The first input to the third multiplexer 206 is p and the second input is zero. The first input to the fourth multiplexer is p and the second input is 1. First input to the multiplexers is selected at the respective outputs if the value of the signal pos is zero. Otherwise the second input to the multiplexers is selected as the respective output.

Figure 12D:
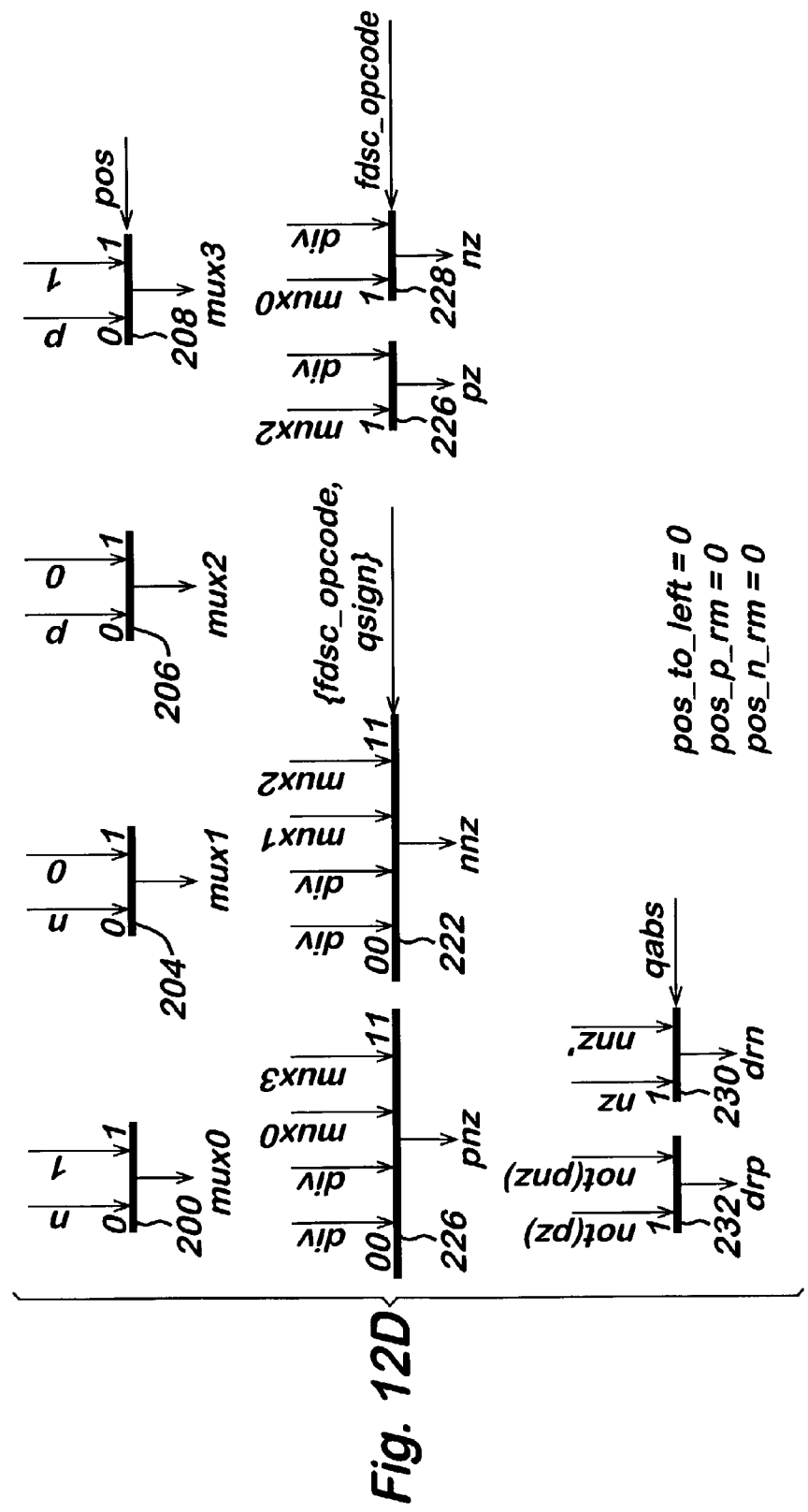
FIG. 12d illustrates the generation of the drp and drn signals, showing the generation of the x000 bit slice.

Reference is made to FIG. 12D which shows the x000 bit slice. The much simplified version of the circuitry is possible as the signal pos to left equals zero, pos_prm equals zero and pos nrm equals zero. The first to fourth multiplexers 200–208 are as shown in FIG. 12C. All of the OR gates can be omitted. The fifth multiplexer 224 is as described in relation to FIG. 12B. The fifth multiplexer 222 has the output of the second multiplexer 204 instead of the input 1 nrm and the output of the third multiplexer instead of the input 2 nrm. The seventh multiplexer 226 is as in FIG. 12B. The eighth multiplexer has the output of the first multiplexer 200 instead of the input 0 nrm. The ninth and tenth multiplexers are unchanged.

As can be seen, the different execution units can be modified so that an optimum bit slice is provided.

Reference will now be made to FIG. 17 which shows a bit slice of the on the fly quotient decoder. This is in addition to the circuitry already described in relation to FIG. 12. FIG. 17A shows the generic bit slice. As mentioned previously the implementation of the on the fly quotient decoder 156 propagates the quo_p and quo_n values as root multiples and these bits must be removed before performing the quotient decoding and then replace the end. The generic bit slice illustrates in FIG. 17A provides the positive quotient bit output p_o and the negative quotient bit output n_o. Additionally, the positional bit output pos_o is also output.

Figure 17A:
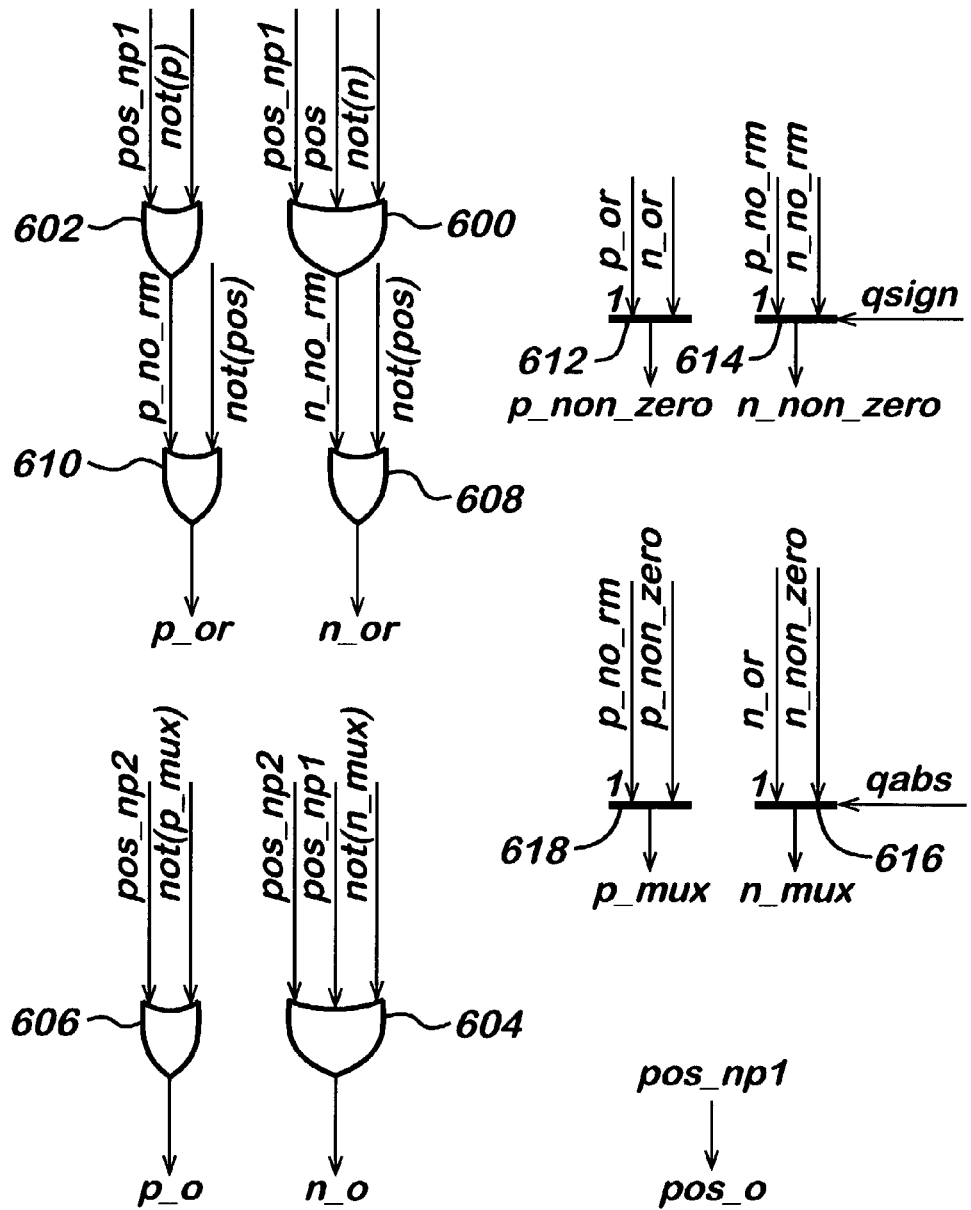
FIG. 17a shows a generic bit slice of the on the fly quotient decoder.

The arrangement of FIG. 17A has four OR gates 600, 602, 604 and 606. The arrangement also has first and second AND gates 608 and 610. Finally, the arrangement also comprises four multiplexers 612, 614, 616 and 618. The first OR gate 602 receives the input pos_np1 (positional bit one to the left) and the input not (p), where p is the positive quotient bit. The output provided by the first OR gate 602 is p_no_rm which is the value of the positive quotient bit with the root multiple bits removed. This is input to the first AND gate 610 (which also receives the input not pos) where pos is the position bit. The output of the first AND gate is p_or.

The second OR gate 600 receives the input pos_np1, pos and not (n) where n is the negative quotient bit. The output of the second OR gate 600 is n_n0_rm. This is input to the second AND gate 608 which also receives the input not (pos). The output of the second AND gate 608 is n_or.

The outputs of the first and second AND gates 610 and 608 are input to the multiplexer 612 as first and second inputs respectively. The output of the first multiplexer 612 is p_non_zero which is the resulting value of the quo_p if the quotient selection output is non zero. The second multiplexer 614 receives a first input of p_no_rm and a second input of n_no_rm. The first and second multiplexers 612 and 614 are controlled by the signal qsign which, when that signal has the value 1, the first input is selected as the output. The output of the first multiplexer 612 is input to the third multiplexer as the second input. The first input is provided by the signal p_no_rm. The fourth multiplexer 616 receives the output from the second multiplexer 614, as a second input and receives the signal n_or as the first input. Again, the third and fourth multiplexers 618 and 616 are controlled by the signal $q_{abs}$. When that signal has the value 1, the first input is selected as the output.

The third OR gate 606 has the input pos_np2, that is the positional bit to positions to the left as the first input and the signal not (p_mux) as the second input. The output of the third OR gate 606 provides the signal p_o, that is the positive quotient output bit. The fourth OR gate 604 receives the inputs pos_np2, pos_np1 and not (n_mux). This OR gate 604 provides the output n_o. It should be appreciated that the signal pos_np1 provides the signal pos_o, that is an incremented version of the position bit which is used by the next execution unit.

Reference is made to the following Table 7:

TABLE 7

| Execution unit | Bit position | | | |
|---|---|---|---|---|
| | 54 | 53 | even cells 52.0 | odd cells 51.1 |
| EU1 | x00 | 0x0 | x0x | 0x0 |
| EU2 | 000 | x00 | 0x0 | x0x |

Figure 17B:
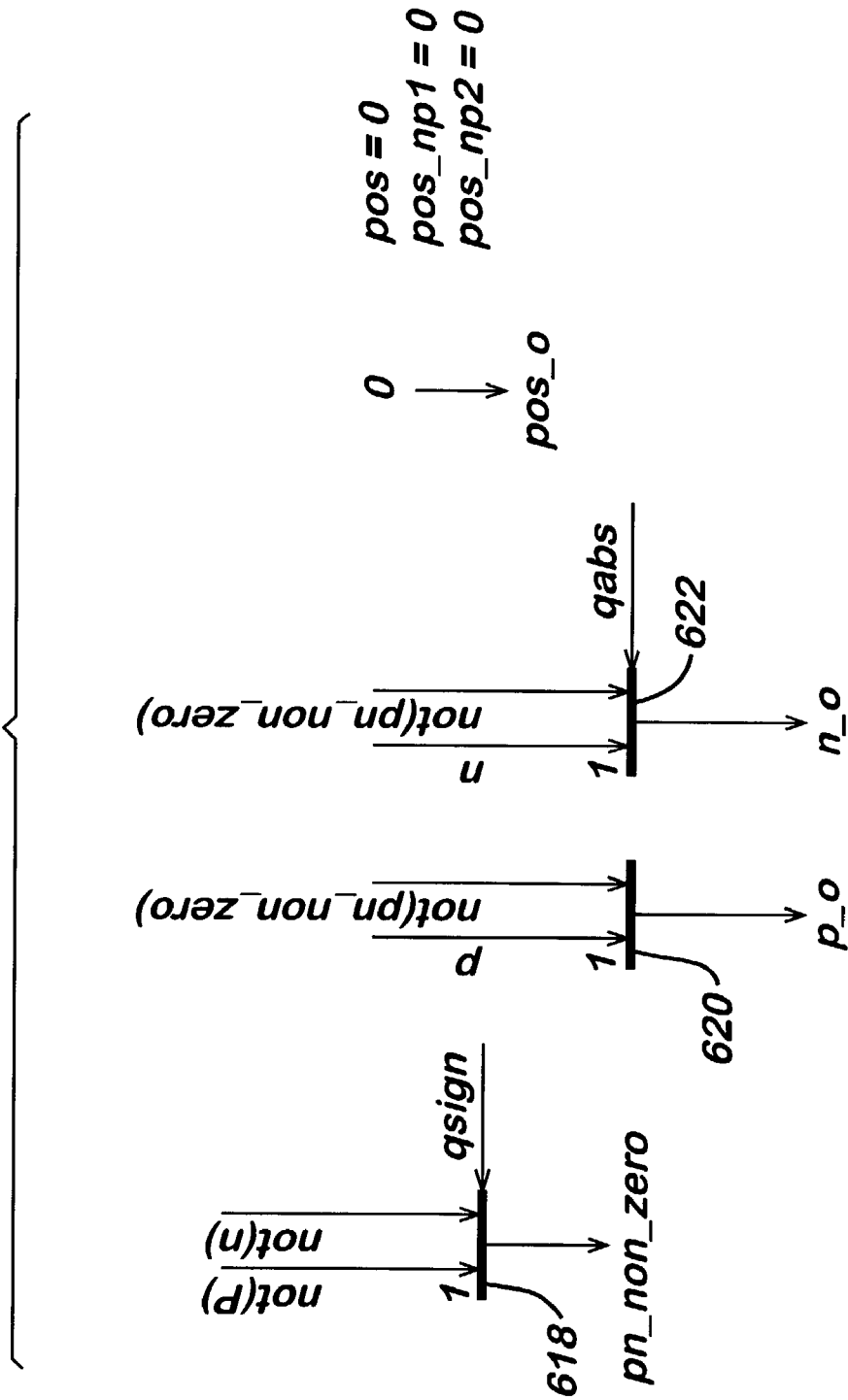
FIG. 17b shows a 000 bit slice of the on the fly quotient decoder.

As can be seen, the generic bit size described in relation to FIG. 17A, in practice does not need to be implemented in each of the execution units. Rather, this can be optimized. FIG. 17B shows the bit slice 000. In this situation, pos=zero, pos_np1 and pos_np2 both equal zero. Accordingly, the OR gates and AND gates can be omitted. Additionally, the multiplexers can be simplified so that there are three. The first multiplexer has a first signal of not (p) and a second signal of not (n). The first multiplexer 618 provides the output pn_non_zero. The second multiplexer 220 receives a first signal of p and a second signal of not (pn_non_zero) as a second signal. The third multiplexer 622 receives the signal n as a first input and has the same second signal as the second multiplexer. The second multiplexer 620 provides the output p_o whilst the third multiplexer provides the signal n_o. All three multiplexers are controlled by the signal $q_{abs}$, which causes the first input to the selected when that signal has the value 1.

Figure 17C:
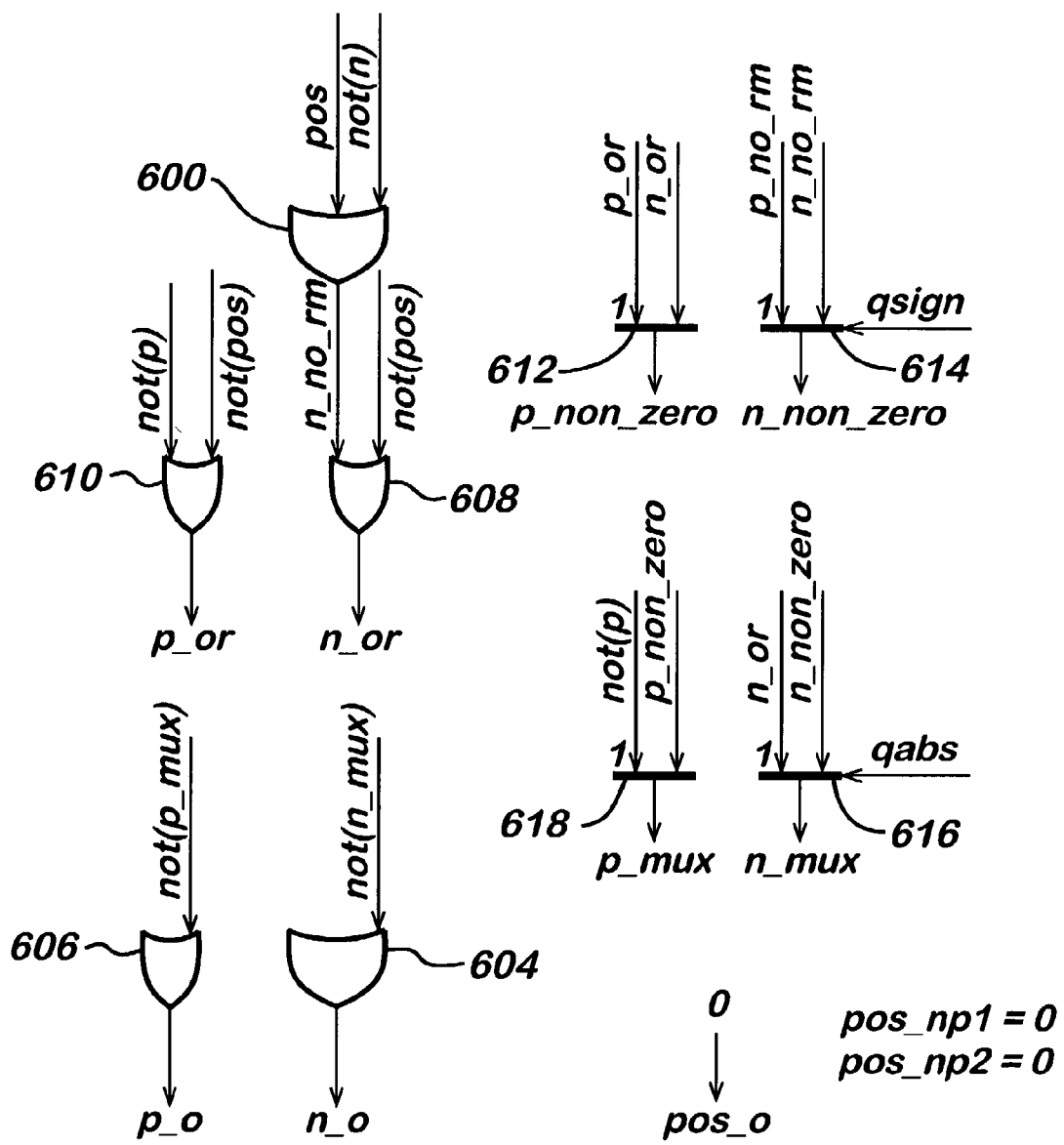
FIG. 17c shows a x00 bit slice of the on the fly quotient decoder.
Figure 17D:
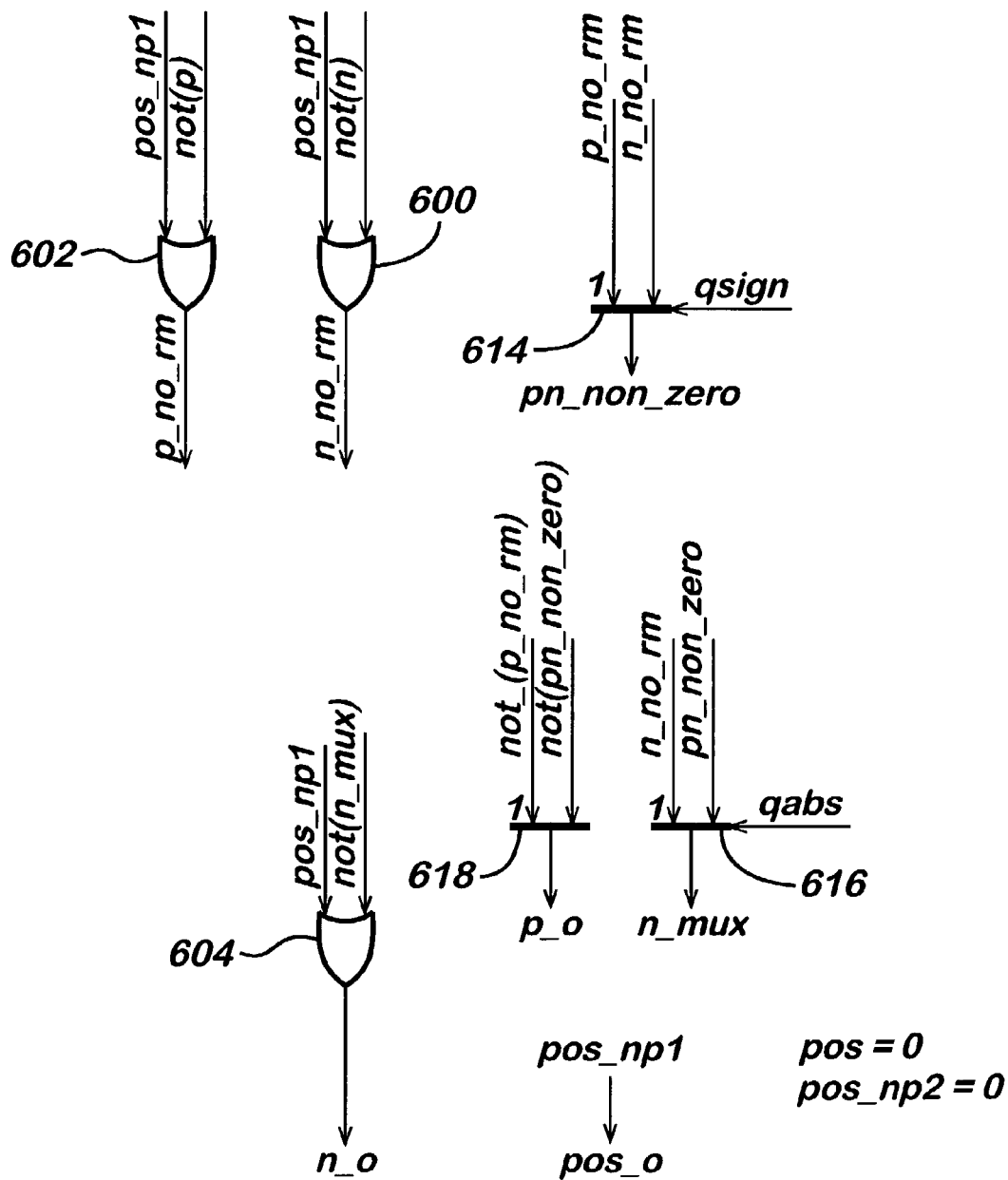
FIG. 17d shows a 0x0 bit slice of the on the fly quotient decoder.

Reference is made to FIG. 17C which shows the x00 bit slice. In this situation, the signal pos_np1 and pos_np2 both equal zero. The first to fourth multiplexers are as shown in FIG. 17A. The first OR gate is omitted and the first input to the AND gate is instead not (p). The second OR gate 600 is similar to that shown in FIG. 17A, but the input pos_np1 has been omitted. The second AND gate 608 is as shown in FIG. 17A. The third OR gate 606 omits the first input pos_np2 whilst the fourth gate 604 omits the inputs pos_np1 and 2. FIG. 17D shows the 0x0 bit slice.

The value of pos is zero as is the value of pos_np2.

The first multiplexer 612 is omitted. The second multiplexer 614 provides the output pn_non_zero. The output of the second multiplexer 614 is input to the fourth multiplexer as in FIG. 17A. That multiplexer also receives the input n_no_rm.

The third multiplexer 618 has been modified so as to receive a first input of not (p_no_rm) and a second input of not (pn_non_zero). The output of the third multiplexer 618 is now p_o.

The first and second AND gates have been omitted as has the third OR gate. The second OR gate 600 omits the input pos. The fourth OR gate 604 omits the input pos_np2. The signal pos_o is derived from pos_np1.

Figure 17E:
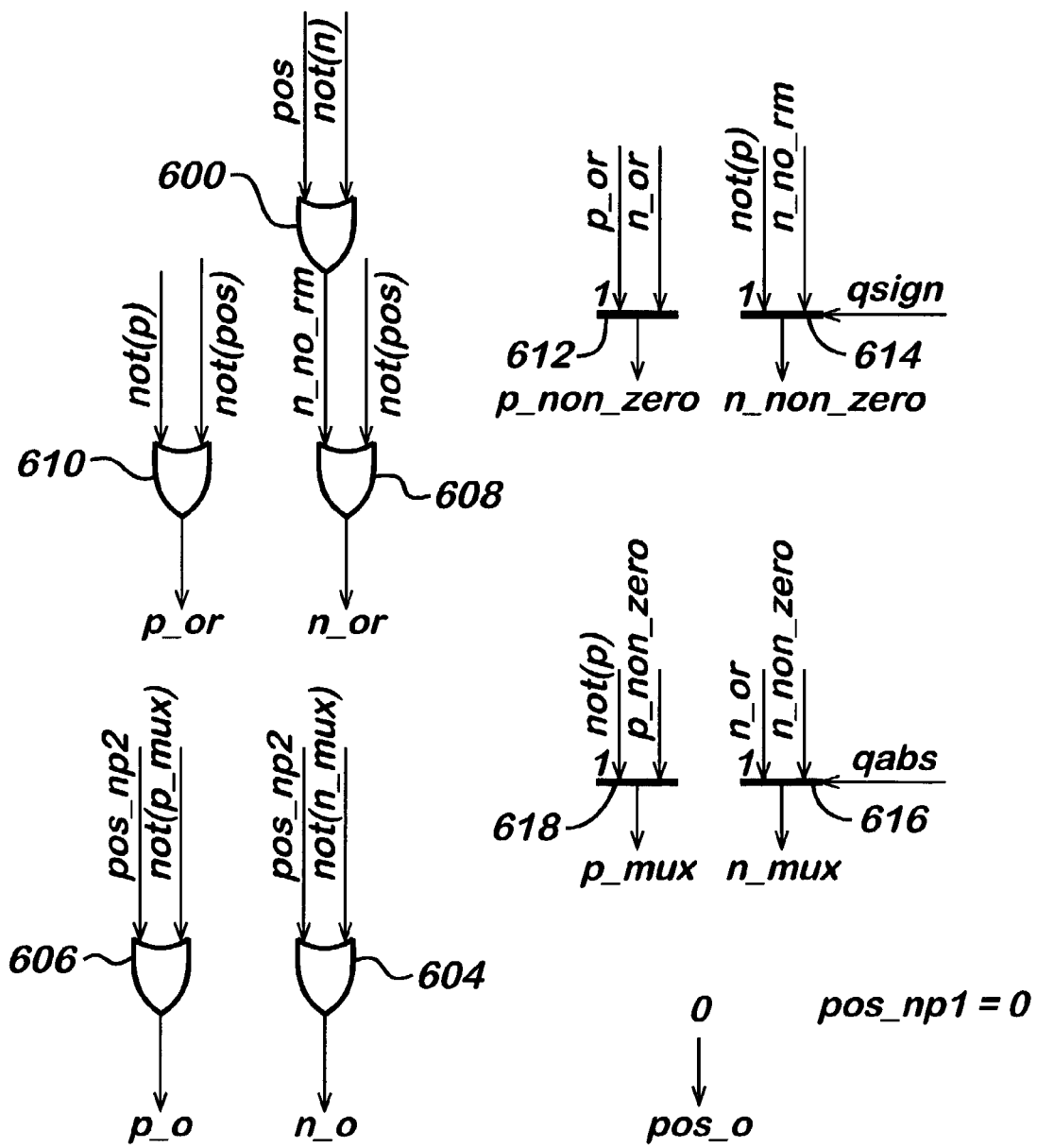
FIG. 17e shows a x0x bit slice of the on the fly quotient decoder.

Finally, reference will be made to FIG. 17E which shows the x0x bit slice. In this situation pos_np1 is zero. The following simplifications of the generic bit slice of FIG. 17A are possible. The first multiplexer 612 is unchanged. The second multiplexer 614 receives the inputs not (p) as the first input instead of p_no_rm. The third multiplexer 618 receives the input not (p) instead of the signal p_no_rm. The fourth multiplexer 616 is unchanged.

The first OR gate is omitted and the arrangement of the second OR gate and first and second AND gates 610 and 608 is as shown in FIG. 17C. The third OR gate 606 is the same as in FIG. 17A and the input pos_np1 to the fourth OR gate 604 has been omitted.

In this way, the circuitry required in the execution units can be minimized.

Figure 15A:
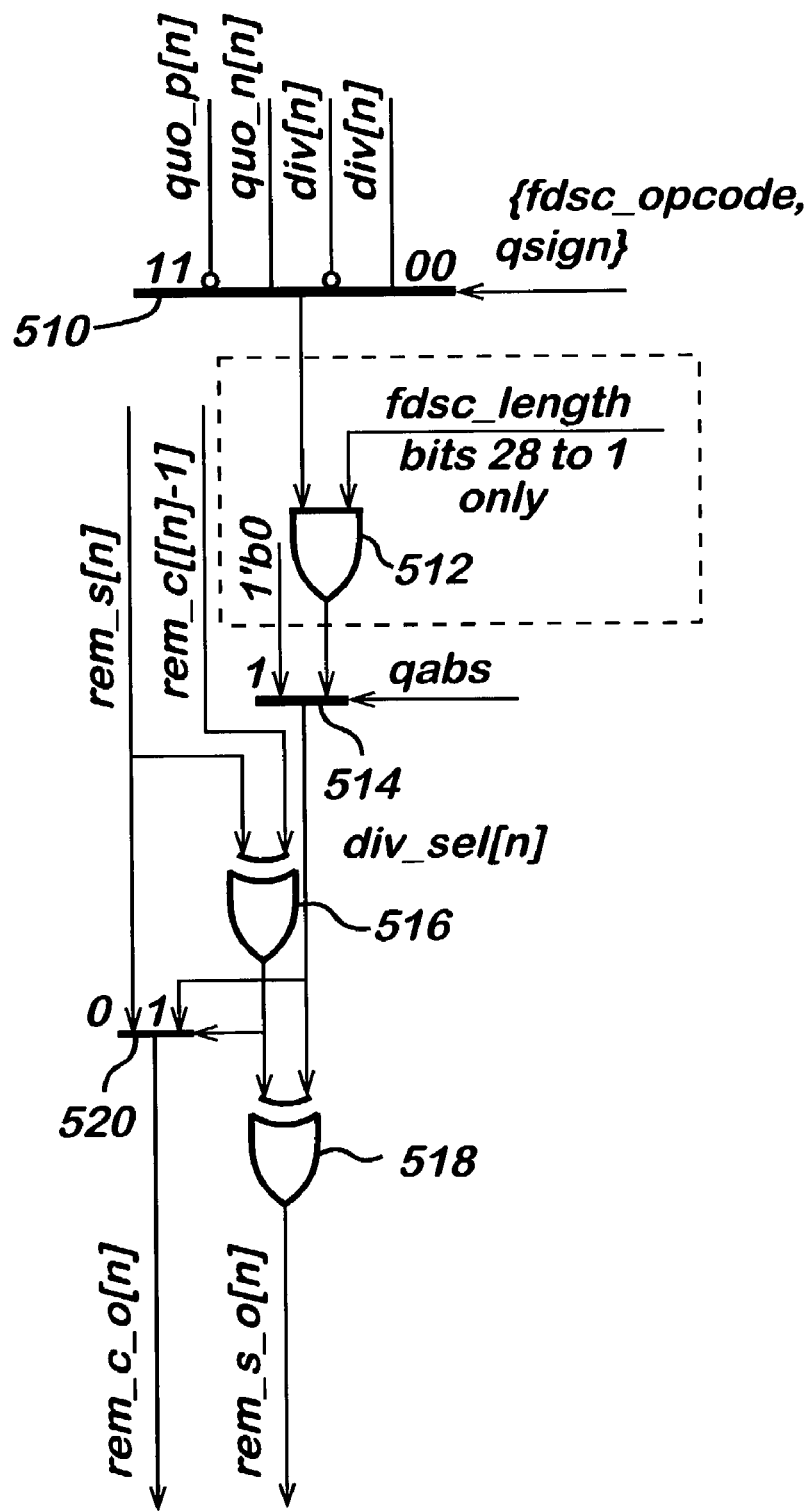
FIG. 15a shows the manner in which preferred embodiments of the invention provide a single generic bit slice from the divider and square root formation unit.

Reference is made to FIG. 15 which shows one way in which preferred embodiments of the present invention implement the divider and square root formation unit 152 and the carry save adder 154 to form one generic bit slice. It should be appreciated that there are two special cases. Bit 0 has only a half adder and adds in the double precision carry and bit 30 which adds in the single precision carry in signal. The function to calculate the carry in for bit 30 is as follows: carry in for bit 30=(the carry in AND floating divide and square root length information—that is whether it is single or double precision) OR the carry remainder for bit 29.

In some embodiments the arrangement shown in FIG. 15 can be simplified in that the bit slice for cells 49 to 29 can be simplified as the word selected by the divide and square root formation unit 152 does not need to be set to zero in the single precision case. This is in contrast to bits 28 to 0 which do need to be set to zero in the single precision case.

The arrangement shown in FIG. 15 has a first multiplexer 510 which receives four inputs: an inverted version of the positive quotient; the negative quotient, the divisor and its inverse. The multiplexer 510 is controlled by the opcode and the qsign signal. When the opcode is 1 and qsign is 1, the inverse positive quotient input is selected, when the opcode is 0 and qsign is 1, the negative quotient input is selected, when the opcode is 1, the divider input is selected if q sign is 0 and its inverse is selected if qsign is 1.

The output of the multiplexer 510 is input to an AND gate 512 which also receives fdsc length information, that is whether it is single or double precision. The AND gate 512 can be omitted for bits 29 to 49 as discussed previously. The output of the AND gate 512 is input to a second multiplexer 514 which has input the value 0. The signal qabs controls the multiplexer 514. The 0 input is selected when qabs is 1. The output of the multiplexer 514 is the output of the divider and square root formation block 152.

A first exclusive OR gate 516 has a first input connected to the sum remainder for bit n and a second input connected to the carry remainder for bit n−1. The carry remainder input is also connected to the input of a third multiplexer 520. The third multiplexer 520 also receives an input from the output of the second multiplexer 514. The third multiplexer is controlled by the output of the first exclusive OR gate 516. The output of the first exclusive OR gate is also input to a second exclusive OR gate 518 which also receives and output from the second multiplexer 514. The output of the third multiplexer 520 provides the carry remainder output and the second exclusive OR gate 518 provides the sum remainder output of the carry save adder 154.

Figure 15B:
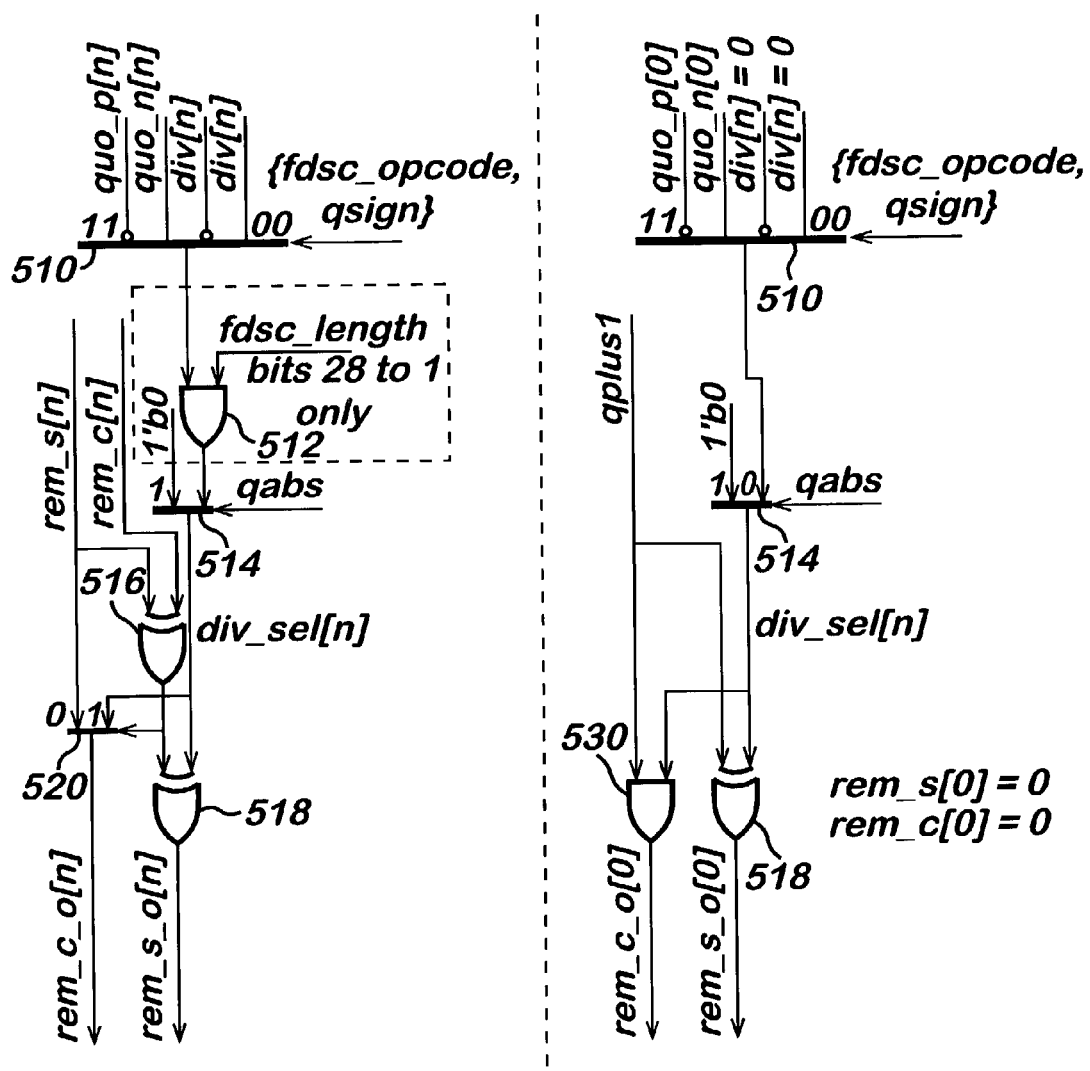
FIG. 15b shows the bit slice from the divider and square root formation unit illustrating the adding of the carry to bit 0.

Reference is made to FIG. 15B which shows on the left the generic carry save adder/divider square formation block on the left along with the modified version of that cell for bit zero where the sum and carry inputs are both zero (as to $R_1$ is being operated on. This means that the logic is simplified and qplus 1 which is set when twos complementation is required) does not add to the critical path. As can be seen, the exclusive OR gate 516 is omitted along with AND gate 512. Additionally, the second multiplexer 520 is also omitted. An AND gate 530 is provided which receives the input q+1 and the output of multiplexer 514. The qplusl signal is input to the exclusive OR gate 518 instead of the output of the first exclusive OR 516. It should be appreciated that the input div [n] of the first multiplexer are both zero.

Figure 15C:
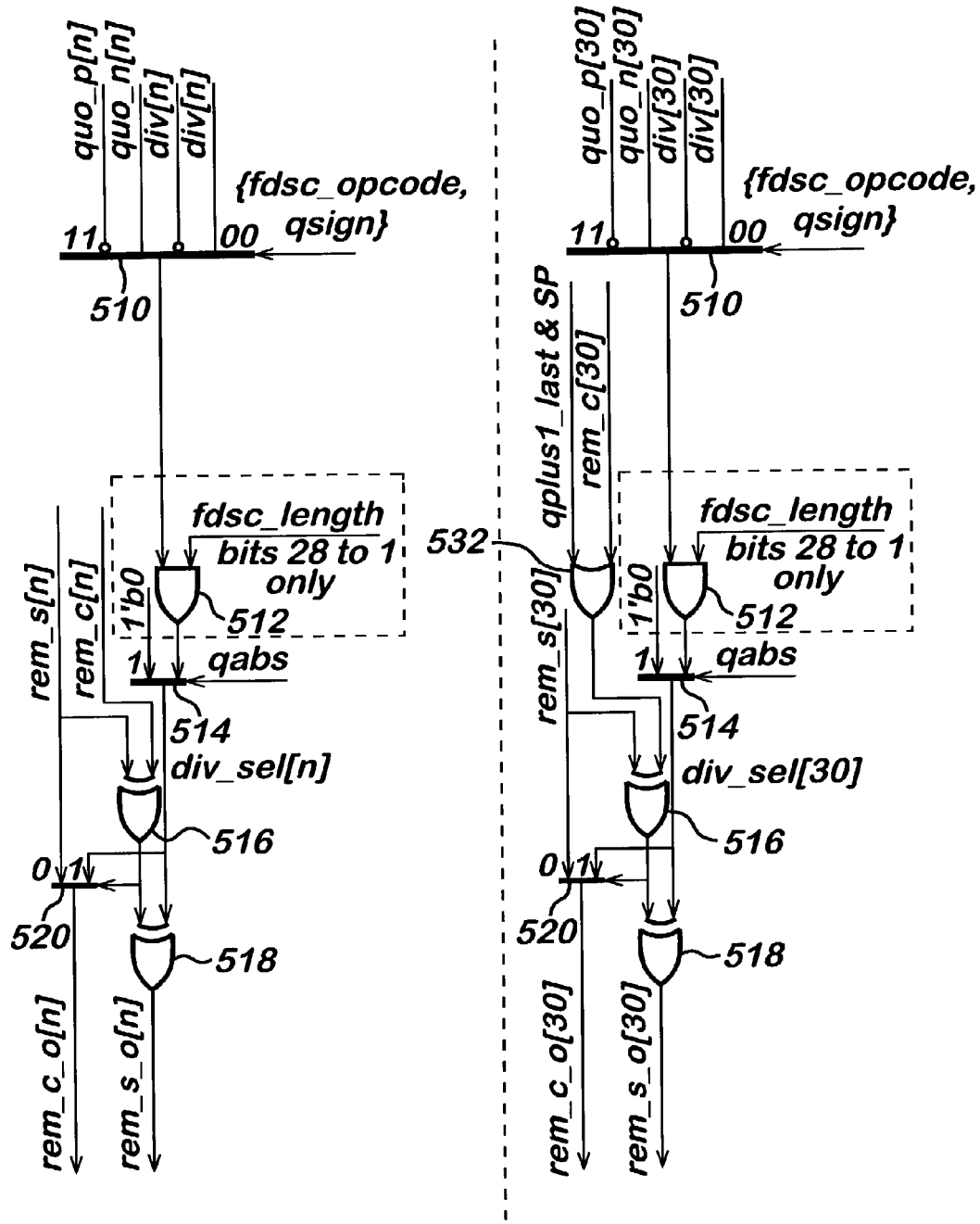
FIG. 15c shows the bit slice from the divider and square root formation unit illustrating the adding of the carry to bit 30.

FIG. 15C shows the bit slice for bit 30. The bit slice 30 is such that the requirement to have an extra full adder for bit 29 is avoided. For reference purposes, the generic bit slice is shown on the left. The bit slice for bit 30 is as the generic bit slice but further includes an additional OR gate which is connected to the input of the first exclusive OR gate 516. This OR gate 532 receives the input q+1₁ last and single precision and an input rem_c [30]. This OR gate 532 is not on the critical path, that is the path providing the output rem_c.

The double precision correction unit 142 will now be described in more detail with reference to FIG. 4. This unit 142 is arranged in parallel with the second execution unit 138. It should be appreciated that the last iteration in a double precision operation will be performed by the first execution unit 136. If the second execution unit 138 were to form an iteration on the output of the first execution unit 136, the final result output would be incorrect. The correction unit 142 receives the output of the first execution unit 136. In embodiments of the present invention, the correction unit 142 can receive every output of the first execution unit or can be arranged so as to receive only the final iteration performed by the first execution unit. The output of the double precision correction unit is input to the multiplexer 140. The output of the multiplexer 134 is also input to this multiplexer 140.

The double precision correction unit provides extra information to the result block 122 so that it can reconstruct the sum/carry remainder words so that when added in the floating point vector unit 108, they give a remainder of the correct sign.

The second execution unit 138 receives the a signal indicating that the last iteration is to be performed. This signal forces the selected quotient bit to zero. Thus, the quotient word remains unchanged and only a remainder shift occurs.

One problem resulting from the remainder shift would be that the sign bit of the remainder, rem_cpa [55], causes the incorrect result correction. Difficulties could occur when the remainder is positive, the remainder is negative and a carry ripple occurs so that the remainder changes sign.

The value of the remainder is not important but only whether it is zero or not (that is when the divisor is +/−1×2ⁿ case). The floating point vector unit 108 is arranged to detect the case where the remainder should be zero but is not. If this occurs the floating point vector unit 108 cancels the instruction. As far as the correction unit 142 is concerned, the sign after the carry propagate addition and whether any bits are set are important. The correction unit 142 effectively preserves the sign record from the first execution unit as well as the carry ripple which will cause the remainder to change sign upon addition and this is used when forming the final result.

Consider FIG. 16. The input to the first execution unit 138 is illustrated along with its output. The values are such that a carry ripple will occur when the result passes through the second execution unit. In the second execution unit, bit 55 is discarded and bits 54, 53 and 52 are summed along with the carry from bit 51. The lower bits pass through an array of 3:2 compressors. To successfully construct a carry ripple, it is necessary to preserve bits 55 to 52 along with whether there is a carry into sum bit 52. A simplistic reconstruction is performed by the correction unit 142 by preserving 52 of the sum and bit 51 of the carry as well as bits 55, 54 and 53, that is everything to the left of the dotted line.

Problems occurs when a carry moves from bit 51 to bit 52 and when the reconstruction occurs this carry is lost, potentially preventing a ripple from occurring. This is the case that is shown in FIG. 16. Accordingly, if rem_s [51]=rem_c [50]=1 at the output of the first execution unit, then an extra bit is added into rem_s [52], rem_c [51] before reconstruction occurs. Embodiments of the present invention do not require that all of the three carry propagate adder bits be added so only the top bit is stored and the AND result of all three bits, which is used to indicate whether a ripple could occur. The reconstructed carry propagate adder word reads:

{rem_cpa_EU2 [55], {2{&rem_cpa-EU2 [55:53]}}}
the output format is
  rem_cpa_o [59:53] = {rem_cpa_Eu2 [55], &
    rem_cpa_Eu2 [55:53], s2, c2, rem_cpa_Eu2 [55:53]}.
s2 and c2 are rem_s [52] and rem_c [51] with the extra carry in added if necessary. { } means concatenation of the values, & is the ANDing of the bits identified.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Circuitry for carrying out an arithmetic operation requiring a plurality of iterations, said circuitry comprising:
   N sets of iteration circuitry arranged one after the other so that at least one of said sets of iteration circuitry receives an output from a preceding one of said sets of iteration circuitry, each of said sets of iteration circuitry comprising at least one adder part, wherein a full adder is provided by an adder part in one of said sets of iteration circuitry and an adder a part in a succeeding one of said sets of iteration circuitry.

2. Circuitry as claimed in claim 1, wherein said at least one adder part comprises at least one of a carry propagate adder and a carry save adder.

3. Circuitry as claimed in claim 1, wherein said adder part comprises a gate.

4. Circuitry as claimed in claim 3, wherein said gate is a XOR gate.

5. Circuitry as claimed in claim 1, wherein said adder part in one of said sets of iteration circuitry is arranged to receive a sum input and a remainder input.

6. Circuitry as claimed in claim 1, wherein said adder part in one of said sets of iteration circuitry is arranged to receive a sum input and a carry input.

7. Circuitry as claimed claim 1, wherein said adder part in a succeeding one of said sets of iteration circuitry comprises at least one of a gate and a multiplexer.

8. Circuitry as claimed in claim 7, wherein said multiplexer is arranged to be controlled by the output of the adder part in one of said sets of iteration circuitry.

9. Circuitry as claimed in claim 7, wherein said multiplexer is arranged to receive one input which is input to the adder part in one of said sets of iteration circuitry and a further input which is not input to the adder part in one of said sets of iteration circuitry.

10. Circuitry as claimed in any of claim 7, wherein said gate of said adder part in a succeeding one of said sets of iteration circuitry is arranged to receive an output of said adder part in one of said sets of iteration circuitry and a further input which is not input to the adder part in one of said sets of iteration circuitry.

11. Circuitry as claimed in claim 1, wherein said full adder is arranged to receive one input later in time than at least one other input to the full adder.

12. Circuitry as claimed in claim 11, wherein said one later input in time is received by said adder part in a succeeding one of said sets of iteration circuitry.

13. Circuitry as claimed in claim 11, wherein said one input is a carry.

14. Circuitry as claimed in claim 11, wherein said one input is an arithmetic operation selection signal.

15. Circuitry as claimed in claim 1, wherein said output of said full adder is a sum output and a carry output.

16. Circuitry for carrying out an arithmetic operation requiring a plurality of iterations, said circuitry comprising:
    a first iteration circuit having a first input and a first output;
    a second iteration circuit having a first and a second input, wherein the first input is coupled to the first output of the first iteration circuit;
    a circuit for selectively coupling certain starting values for the arithmetic operation to the first input of the first iteration circuit at a beginning of the arithmetic operation and for selectively coupling remaining starting values to the second input of the second iteration circuit;
    wherein the first and second iteration circuits together form a full adder circuitry.

17. The circuitry of claim 16, wherein said full adder circuitry comprises at least one of a carry propagate adder and a carry save adder.

18. The circuitry of claim 16, wherein said full adder circuit comprises a first adder part implemented by the first iteration circuit and a second adder part implemented by the second iteration circuit.

19. The circuitry of claim 16, wherein the full adder circuitry generates a sum output and a carry output.

20. A circuit for carrying out an arithmetic operation, comprising:
    a full adder, the full adder formed of first and second adder parts, the full adder comprising:
        a first iteration circuit for implementing the first adder part; and
        a second iteration circuit, connected to receive an output of the first iteration circuit, for implementing the second adder part.

* * * * *

UNITED STATES PATENT AND TRADEMARK OFFICE
CERTIFICATE OF CORRECTION

| | | |
|---|---|---|
| PATENT NO. | : 7,174,357 B2 | Page 1 of 1 |
| APPLICATION NO. | : 10/291850 | |
| DATED | : February 6, 2007 | |
| INVENTOR(S) | : Tariq Kurd | |

It is certified that error appears in the above-identified patent and that said Letters Patent is hereby corrected as shown below:

In the Claims:

At column 24, claim number 1, line number 47, please delete the word "a" so that the line read -- iteration circuitry and an adder part in a succeeding --

Signed and Sealed this
Twenty-first Day of February, 2012

David J. Kappos
*Director of the United States Patent and Trademark Office*